(12) United States Patent
Tsukamoto et al.

(10) Patent No.: US 6,801,328 B2
(45) Date of Patent: *Oct. 5, 2004

(54) DATA PROCESSING APPARATUS OPERABLE IN ACCORDANCE WITH A CONNECTED IC CARD

(75) Inventors: Takeshi Tsukamoto, Kawasaki (JP); Toshio Kenmochi, Yokohama (JP); Yosuke Ezumi, Takasaki (JP); Hisashi Toyoda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,014

(22) Filed: Aug. 21, 1997

(65) Prior Publication Data

US 2002/0048033 A1 Apr. 25, 2002

Related U.S. Application Data

(62) Division of application No. 08/420,735, filed on Apr. 11, 1995, now abandoned.

(30) Foreign Application Priority Data

Apr. 20, 1994 (JP) ............................................. 6-081772
Apr. 20, 1994 (JP) ............................................. 6-081965
Apr. 20, 1994 (JP) ............................................. 6-082050
Jun. 29, 1994 (JP) ............................................. 6-147596

(51) Int. Cl.$^7$ .............................................. G06K 15/00
(52) U.S. Cl. ..................................... 358/1.13; 358/1.15
(58) Field of Search ................................. 395/101, 114, 395/115, 112, 106, 109; 358/404, 444, 400, 401, 407, 437, 468; 379/93, 100

(56) References Cited

U.S. PATENT DOCUMENTS

| | | | | |
|---|---|---|---|---|
| 4,821,107 A | * | 4/1989 | Naito et al. ................. | 358/440 |
| 4,964,154 A | * | 10/1990 | Shimotono ................... | 379/100 |
| 5,220,674 A | * | 6/1993 | Morgan et al. ............. | 709/223 |
| 5,408,520 A | * | 4/1995 | Clark et al. .................... | 379/93 |
| 5,428,671 A | * | 6/1995 | Dykes et al. ................. | 379/93 |
| 5,469,332 A | * | 11/1995 | Alvite .......................... | 361/737 |
| 5,528,758 A | * | 6/1996 | Yeh ....................... | 395/200.08 |
| 5,900,947 A | | 5/1999 | Kenmochi et al. .......... | 358/442 |
| 5,966,669 A | | 10/1999 | Kenmochi et al. .......... | 455/557 |

FOREIGN PATENT DOCUMENTS

| | | |
|---|---|---|
| EP | 0579164 | 1/1994 |
| EP | 0579557 | 1/1994 |
| JP | 1-170261 | 7/1989 |

OTHER PUBLICATIONS

Pat. Abs. Jp., vol. 015, No. 387 (E–1117), Sep. 30, 1991 (JP–A–03155264).

Pat. Abs. Jp., vol. 016, No. 254 (E–1213), Jun. 9, 1992 (JP–A–04054764).

EDN, vol. 37, No. 22, Oct. 29, 1992, pp. 49–52, 54, G. Legg, "Small, smart PC cards strive for compatibility".

IEEE Spectrum, vol. 29, No. 6, Jun. 1, 1992, pp. 46–50, D. Sternglass, "The future is in the PC cards".

* cited by examiner

Primary Examiner—Gabriel Garcia
(74) Attorney, Agent, or Firm—Fitzpatrick, Cella, Harper & Scinto

(57) ABSTRACT

A card interface or the like having compatibility is employed for connecting a communication module or the like for transmitting and/or receiving data. The communication module is changed so as to realize a variety of functions without enlargement of the size of the apparatus. The connection has compatibility so that a function module for adding and/or changing functions is employed in addition to the communication module. Therefore, the function can be improved without the cost rising.

16 Claims, 39 Drawing Sheets

DATA PROCESSING APPARATUS OPERABLE IN ACCORDANCE WITH A CONNECTED IC CARD

This application is a division, of application Ser. No. 08/420,735 filed Apr. 11, 1995 now abandoned.

BACKGROUND OF THE INVENTION

1. Field of the Invention

The present invention relates to a data processing apparatus capable of transmitting/receiving data, and more particularly to a data processing apparatus adaptable to a plurality of communication specifications.

2. Related Background Art

Hitherto, a facsimile apparatus has been known as a data processing apparatus capable of performing data communication in such a manner that data is transferred/received through the wire subscriber's lines. Furthermore, a suggestion has been made to use a facsimile apparatus of the foregoing type as a printer for recording data transferred from an external apparatus, such as a computer, or to use the same as a wireless-type communication apparatus.

The foregoing case, however, requires an RS-232C Interface and Centronics Interface for establishing the connection with external apparatuses and an interface for the wireless communication to be individually provided, as well as an interface for the wire subscriber's line.

The wireless communication system sometimes further requires an individual interface provided depending upon whether the communication method is analog or digital, for example.

Moreover, the specifications for the communication lines are different among countries and areas, thus raising the necessity of designing communication line interface units to be adaptable to the different specifications.

Thus, provision of the interfaces to be adaptable to the various versions prevents reduction in the size and weight of the apparatus.

Furthermore, designing the communication line interfaces to be adaptable to different specifications for the lines requires a great deal of labor, and apparatuses having different specifications must be manufactured to be adaptable to the subject sales areas. As a result, the benefits ordinarily sought from mass production cannot be obtained, and difficulties occur in adjusting the manufacturing process.

In addition, employing different specifications adaptable to different countries or regions prevents the apparatuses from being used in other countries or regions.

SUMMARY OF THE INVENTION

Accordingly, an object of the present invention is to provide a data processing apparatus capable of overcoming the foregoing problems and reducing the size and weight of the same.

Another object of the present invention is to provide a data processing apparatus capable of realizing data communication adapted to different communication methods without enlargement of the size thereof.

A still another object of the present invention is to provide a data processing apparatus that can be used in countries or regions whose line specifications are different.

A further object of the present invention is to provide a data processing apparatus capable of reducing the cost required to manufacture the apparatus.

A still further object of the present invention is to provide a data processing apparatus to which a card interface can be applied.

Another object of the present invention is to provide a data processing apparatus to which a variety of modules can be applied by a common connection means.

Another object of the present invention is to provide a data processing apparatus capable of easily adding or changing functions.

Another object of the present invention is to provide a data processing apparatus to which a module having compatibility with a module for use in another apparatus can be applied.

Other and further objects, features and advantages of the invention will be evident from the following detailed description of the preferred embodiments in conjunction with the attached drawings.

DESCRIPTION OF THE PREFERRED EMBODIMENTS

The preferred embodiments of the present invention will now be described with reference to the drawings.

First Embodiment

Figure 1:
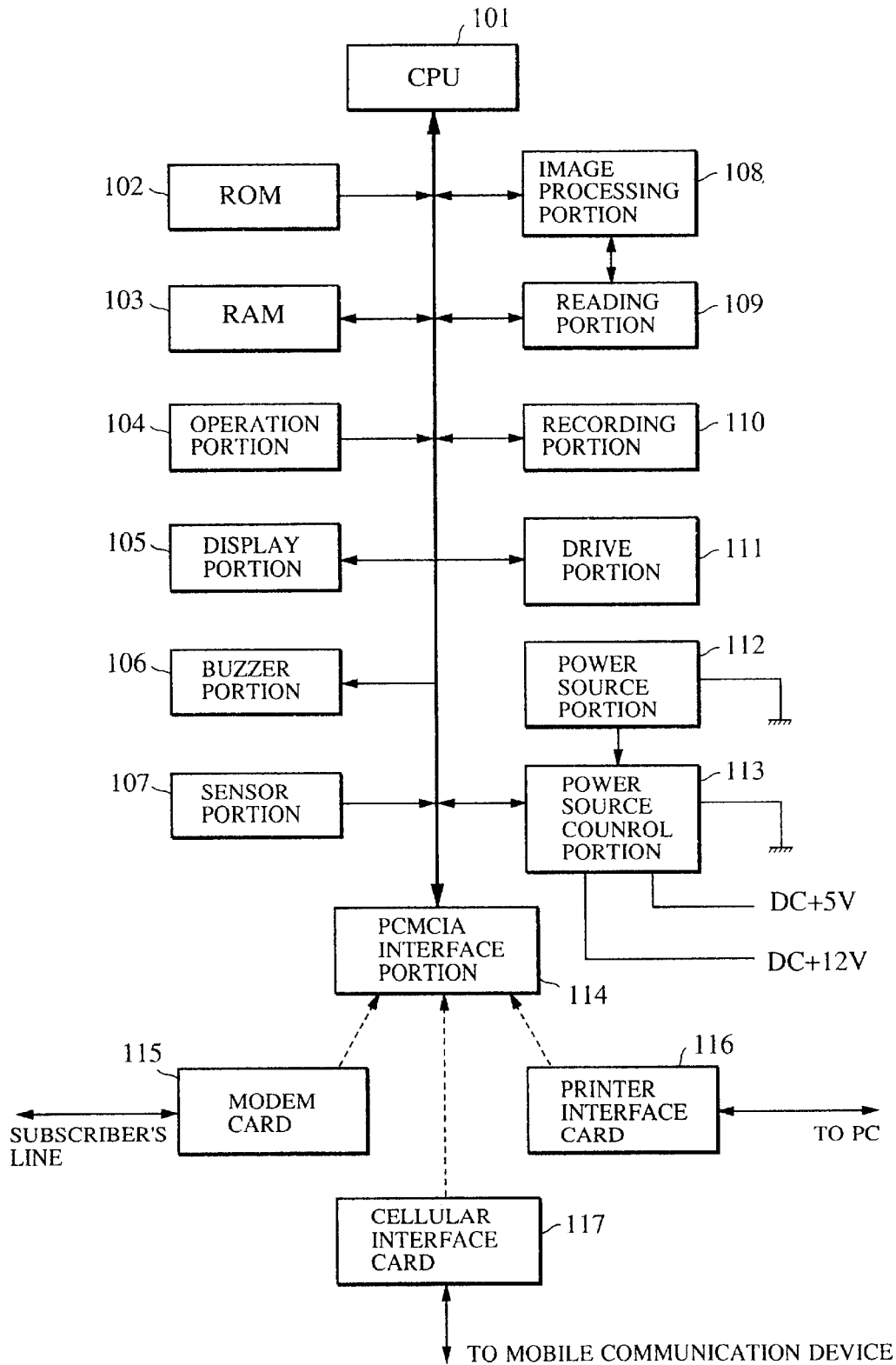
FIGS. 1 and 26 are block diagrams showing the structure of a data processing apparatus according to an embodiment of the present invention.

FIG. 1 is a block diagram of the body of a communication apparatus according to an embodiment of the present invention. The data communication apparatus according to this embodiment has functions of an ordinary facsimile apparatus and comprises an interface adaptable to a card. Reference numeral 101 represents a CPU that controls the data communication apparatus in accordance with a program stored in a ROM 102, the CPU controlling the elements of the data communication apparatus consisting of a RAM 103, an operation portion 104, a display portion 105, a buzzer portion 106, a sensor portion 107, an image processing portion 108, a reading portion 109, a recording portion 110, a drive portion 111, a power source portion 112, a power-source control portion 113 and a PCMCIA Interface portion 114. The foregoing elements will now be described.

The RAM 103 is a memory for storing image data read by the reading portion 109 or image data to be recorded by the recording portion 110, the RAM 103 being arranged to store image data to be transmitted from the MODEM card 115 through the PCMCIA Interface portion 114 and received data supplied from a MODEM card 115 or a printer interface card 116. The RAM 103 is able to temporarily store a variety of other data items.

The operation portion 104 is a key panel for operating the apparatus, the operation portion 104 consisting of a start key for starting copying or transference/receipt of data, a stop key for stopping the same, keys for setting any of various modes, and a ten key pad for enabling dial operation. The states of the foregoing keys are detected by the CPU 101 to control the respective portions in accordance with the detected states.

The display portion 105 comprises a liquid crystal display unit (an LCD), its LCD driver and an LED, the display portion 105 being arranged to display a variety of states including the state of operation while being controlled by the CPU 101.

The buzzer portion 106 comprises a piezoelectric buzzer that is controlled by the CPU 101 to produce a key touch sound when the key in the control portion 104 is depressed, a completion sound notifying the operator of the completion of each operation and an alarm sound if an error takes place.

The sensor portion 107 comprises a recording-paper width sensor, a recording-paper existence sensor, an original-document width sensor and an original-document existence sensor, the sensor portion 107 being arranged to detect the state of an original document and recording paper and to communicate the result of the detection to the CPU 101.

The image processing portion 108 comprises a clock supply circuit for controlling the reading portion 109, a peak holding circuit, a shading correction circuit, an A/D conversion portion and a DMA controller. The image processing portion 108 sequentially digitizes image data read by the reading portion 109 to subject the image data to image processes, such as edge emphasizing and binary-coding processes and to transfer the processed image data to the RAM 103.

The reading portion 109 comprises a photoelectric conversion means, such as a CCD line sensor or a contact-type image sensor (CS), the reading portion 109 being arranged to read an original document by means of the CCD or the CS thereof under control of the CPU 101. The reading portion 109 supplies read data to the image processing portion 108.

The recording portion 110 comprises a DMA controller, a general-purpose IC and a thermal head or an ink jet head, the recording portion 110 being arranged to sequentially take data stored in the RAM 103 under control of the CPU 101 to print out it on B4 or A4 recording paper as a hard copy.

The drive portion 111 comprises a stepping motor for rotating paper supplying and discharging rollers of the reading portion 109 and the recording portion 110, a motor driver circuit and gears for transmitting the rotational force of the motor, the drive portion 111 being under control of the CPU 101.

Figure 2:
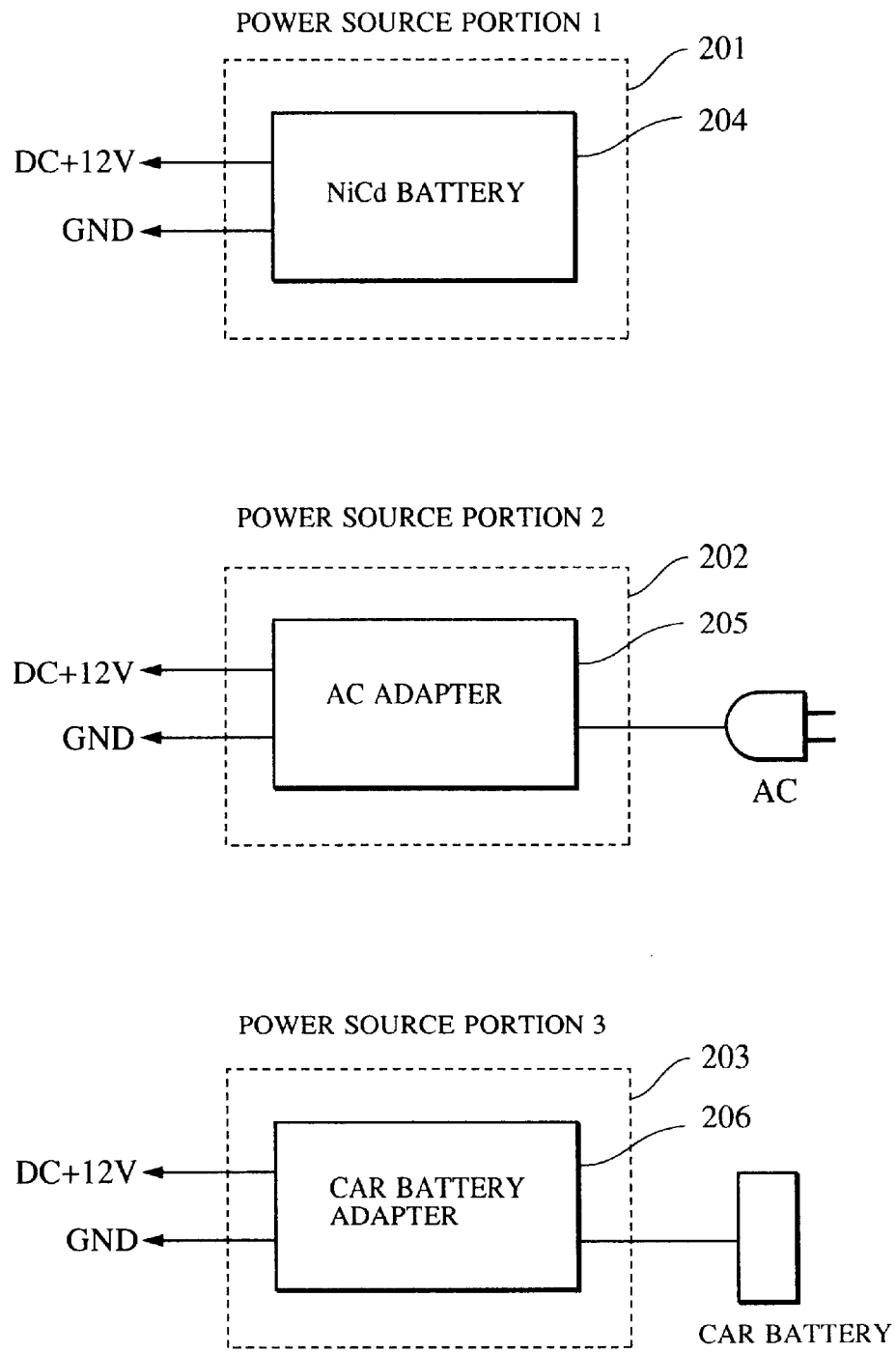
FIG. 2 is a block diagram showing an example of the structure of a power source portion 112.

The power source portion 112 supplies DC power and has any of three types of structures shown in FIG. 2 to supply +12V DC to the power-source control portion 113.

A power source portion 201 comprises a +12V DC Ni. Cd battery 204 to supply +12V DC power to respective portions of the body of the apparatus.

A power source portion 202 comprises an AC adapter 205 for converting commercial AC power into +12V DC to supply +12V DC power to the respective portions of the body of the apparatus.

A power source portion 203 comprises a car battery adapter 206 for converting DC power supplied from a car battery mounted on an automobile into stable +12V DC power to supply +12V DC power to the respective portions of the body of the apparatus.

The power-source control portion 113 comprises a contact portion, a switching regulator for stabilizing output voltage and an FET to supply +5V and +12V DC power to the respective portions of the apparatus. The output from the power source portion 113 can arbitrarily be turned on/off in response to a control signal supplied from the CPU 101. The power supply to the respective portions in the apparatus may be individually controlled.

The PCMCIA Interface portion 114 comprises an interface circuit adapted to the interface standard PCMCIA (Personal Computer Memory Card International Association) so that when a MODEM card 115 or a printer interface card 116 adapted to PCMCIA is inserted, the CPU 101 detects card insertion, reads information about the attribute of the card, performs setting and transmits/receives data so that facsimile communication or recording is performed.

The MODEM card 115 is a general-purpose facsimile modem card having a PCMCIA Interface, the MODEM card 115 being inserted into the PCMCIA Interface portion 114 to perform facsimile communication through subscriber's lines under control of the CPU 101.

The printer interface card 116 is a connection adapter card having a PCMCIA Interface that connects personal computers which support a variety of printing software adapted to Centronics Interface. The apparatus according to the present invention, under control of the CPU 101, records data to be printed, the data being supplied from a personal computer connected through the card interface inserted into the PCMCIA Interface portion 114.

Figure 15:
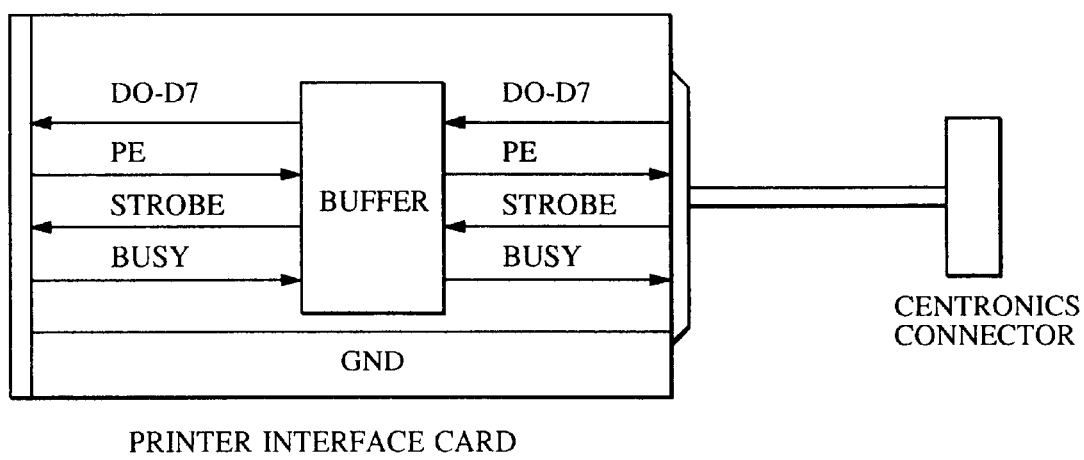
FIGS. 15, 18 and 27 to 32 show the structures of cards that can be applied to the data processing apparatus according to this embodiment of the present invention.

The structure of the printer interface card 116 is shown in FIG. 15.

The printer interface card 116 has a shape and pin configuration conforming to Type-2 of PCMCIA. 8-bit parallel data D0 to D7 to be recorded is transferred through data input/output pins of the printer interface card 116. Signals PE, for notifying the personal computer of the presence/absence of recording paper, BUSY, for notifying the personal computer of a busy state, and STROBE, transmitted from the personal computer, are signals that are out of the PCMCIA regulation. Therefore, the foregoing signals are transferred through the upper three bit input/output pins for address signals. The connection with the personal computer is established through a Centronics® connector (Centronics is a registered trademark of Genicom).

Figure 3:
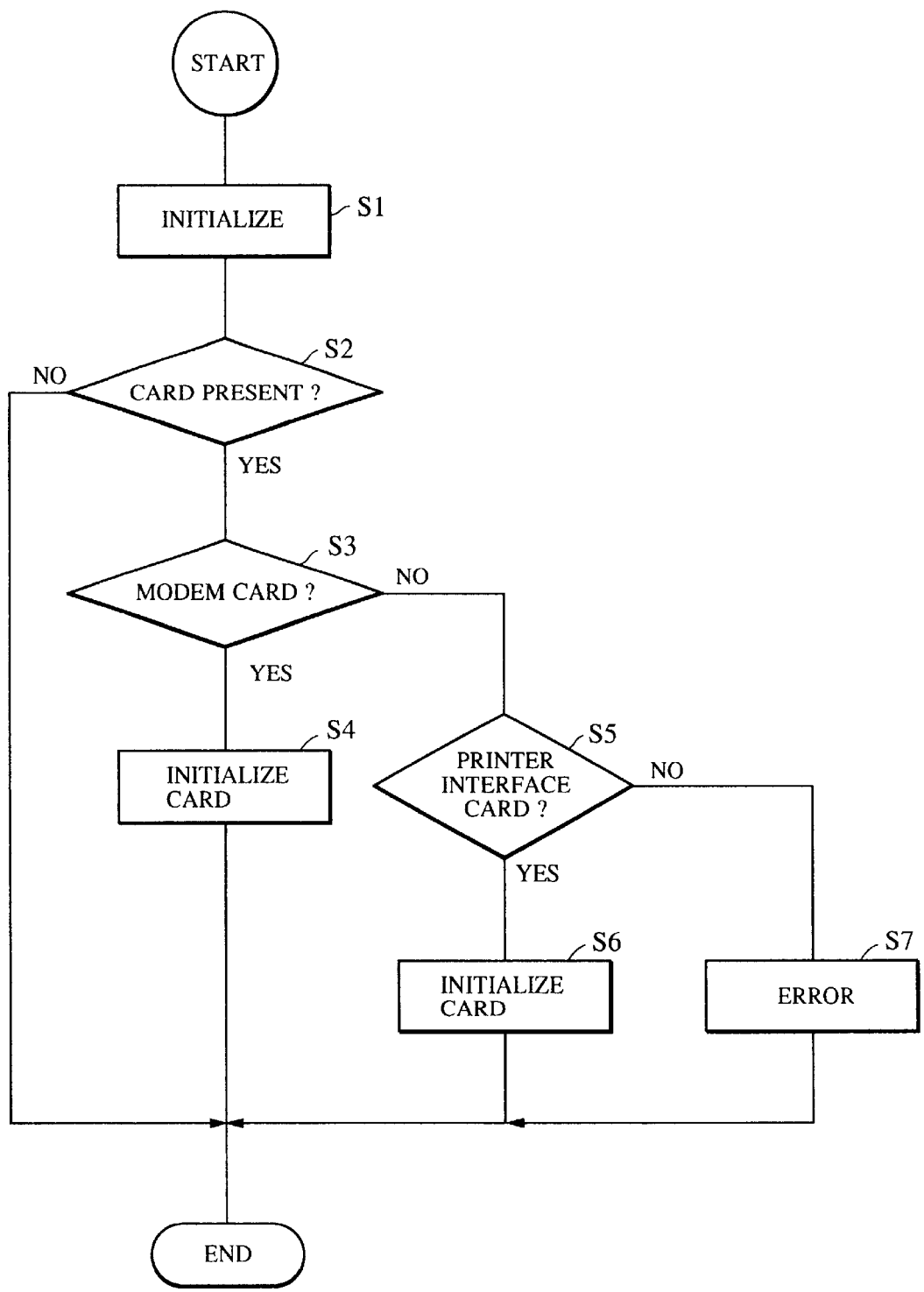
FIGS. 3 to 14, 16, 17, 20 to 25, 41 and 42 are flow charts of the operation of the data processing apparatus.

FIG. 3 is a flow chart showing the operation of the image communication apparatus according to this embodiment to be performed after power has been supplied to the image communication apparatus according to this embodiment. The operation of the image communication apparatus according to this embodiment will now be described with reference to the flow chart shown in FIG. 3.

When power has been supplied to the data communication apparatus according to this embodiment, the apparatus is initialized in step S1, and a detection is made as to whether or not a card conforming to PCMCIA has been inserted into the PCMCIA Interface portion 114, in step S2. If a card conforming to PCMCIA is not detected, the apparatus is brought to a standby state. If a card conforming to PCMCIA has been detected in step S2, a detection is made as to whether or not the card is a MODEM card 115, in step S3. If the card is a MODEM card 115, the card is, in step S4, initialized in accordance with attribute information of the MODEM card 115. If the card is not a MODEM card 115 in step S3, a detection is made as to whether or not the card is a printer interface card 116, in step S5. If the card is a printer interface card 116, the card is initialized in accordance with the attribute information of the printer interface card 116 in step S6. If the card is not a printer interface card 116, a discrimination is made in step S7 that a card, which is neither a MODEM card 115 nor a printer interface card 116, or a card that does not conform to the PCMCIA Interface standard, has been inserted. Then, an error sound is produced by the buzzer portion 106 and an error indication lamp of the display portion 105 is turned on. Although the type of card is identified at the-time of supplying power in the described arrangement, the embodiment is not limited to this arrangement and the card may be identified and initialization of the card may be performed if the card is withdrawn and another presented during the foregoing operation.

In accordance with the flow charts shown in FIGS. 4 to 14, data transmitting and receiving operations to be performed when the MODEM card is connected to the data communication apparatus according to this embodiment, will now be described in detail.

Data communication according to the present invention is arranged in such a manner that an AT command is used to control the MODEM card 115 through the PCMCIA Interface portion 114 to perform facsimile communication through lines, the AT command being a command suggested by Heiz Microcomputer Products and used widely as a command system for externally controlling a modem adapted to a personal computer.

Figure 4:
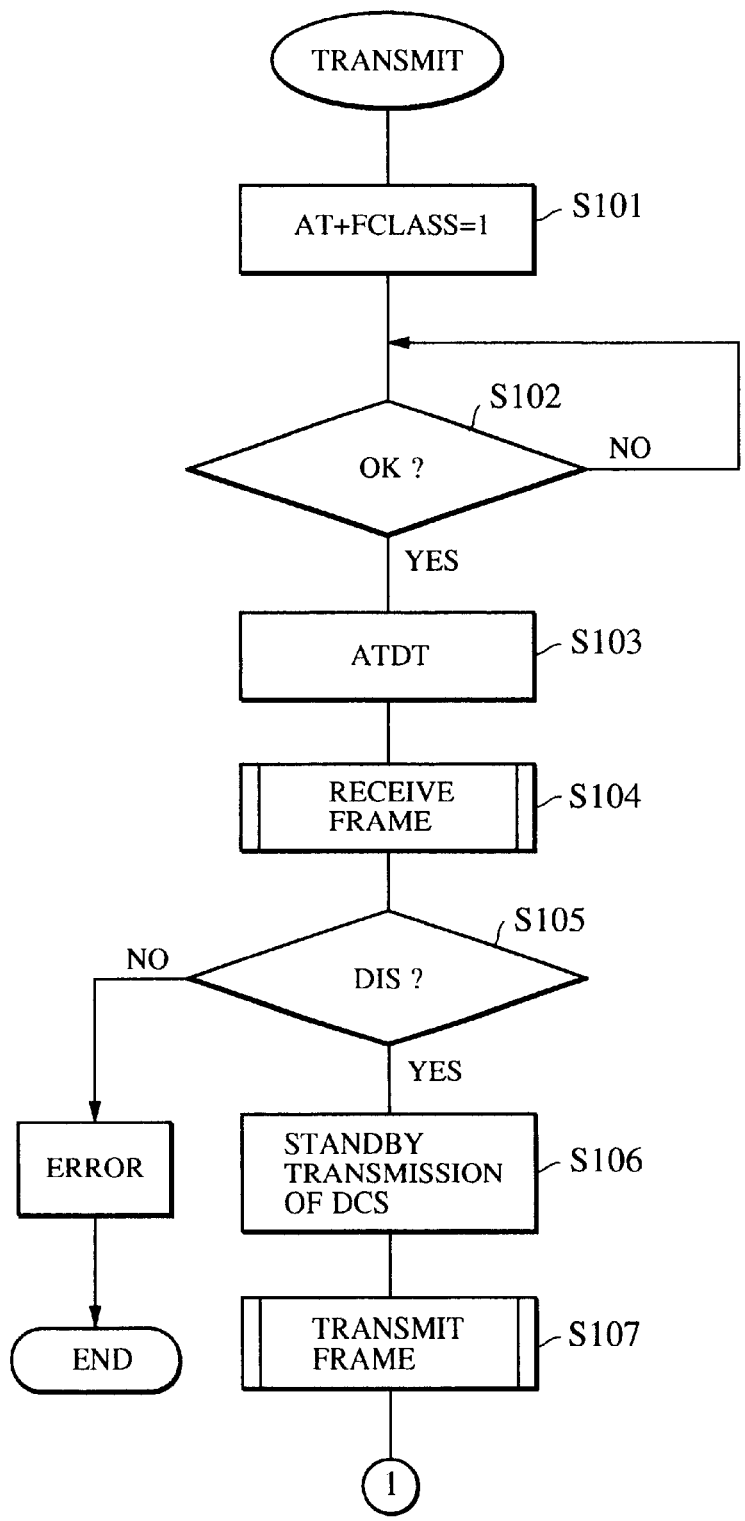
Figure 5:
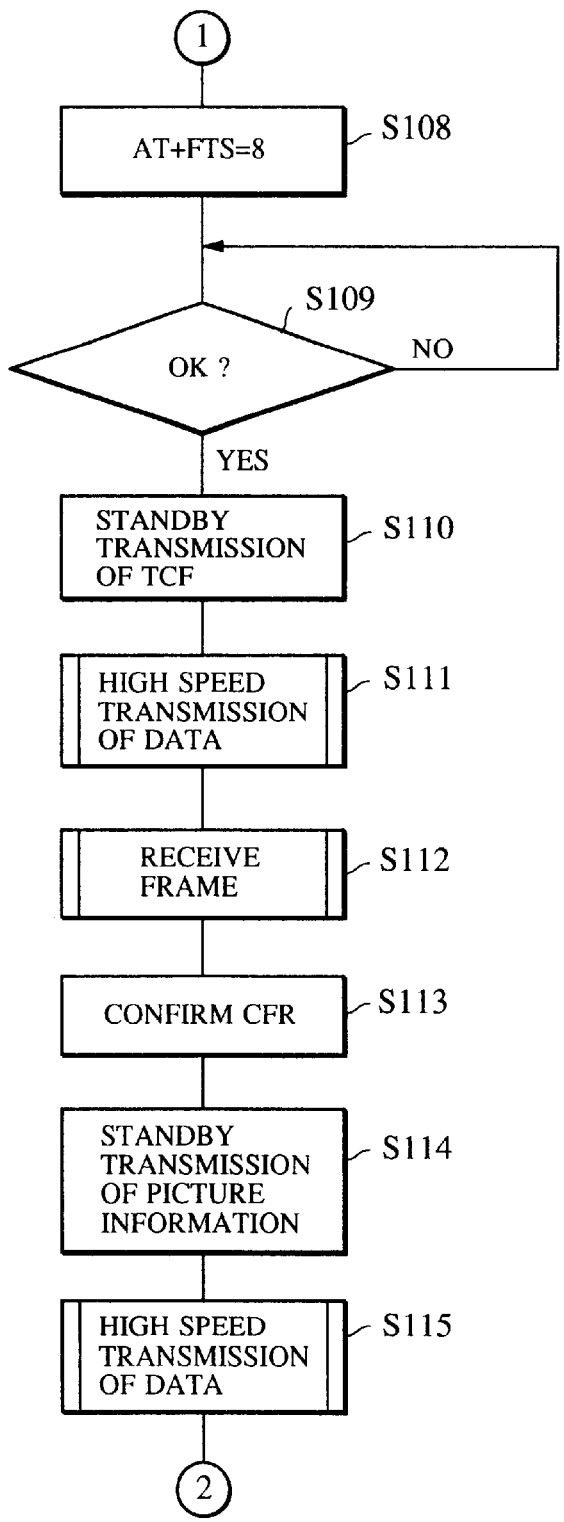
Figure 6:
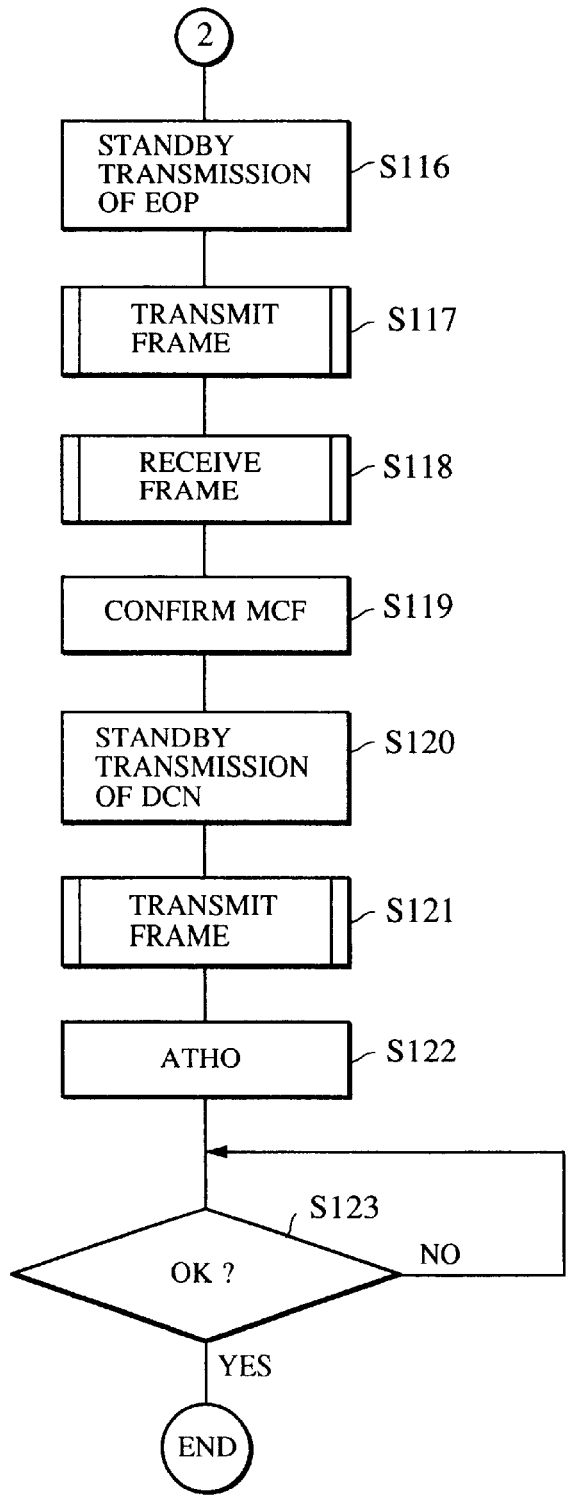

The flow chart shown in FIGS. 4 to 6 shows a facsimile transmitting operation to be performed when a MODEM card is connected to the data communication apparatus according to this embodiment. It should be noted that an original document to be transmitted is set and the number of the station to be called is inputted prior to performing the transmitting operation. The set original document is read by the reading portion 109 and temporarily stored in the RAM 103.

In step S101 command AT+FCLASS=1 is transmitted to the MODEM card 115 conforming to PCMCIA to cause the same to be performed in Facsimile Class 1. In step S102 a response "OK" indicating completion of standby from the MODEM card 115 is waited for. If the response "OK" is detected, a calling operation starts in step S103 so that calling command ATDT is transmitted to the MODEM card 115, and then the telephone number of the station to be connected is transmitted to the same. In step S104 a frame receipt operation starts.

Figure 10:
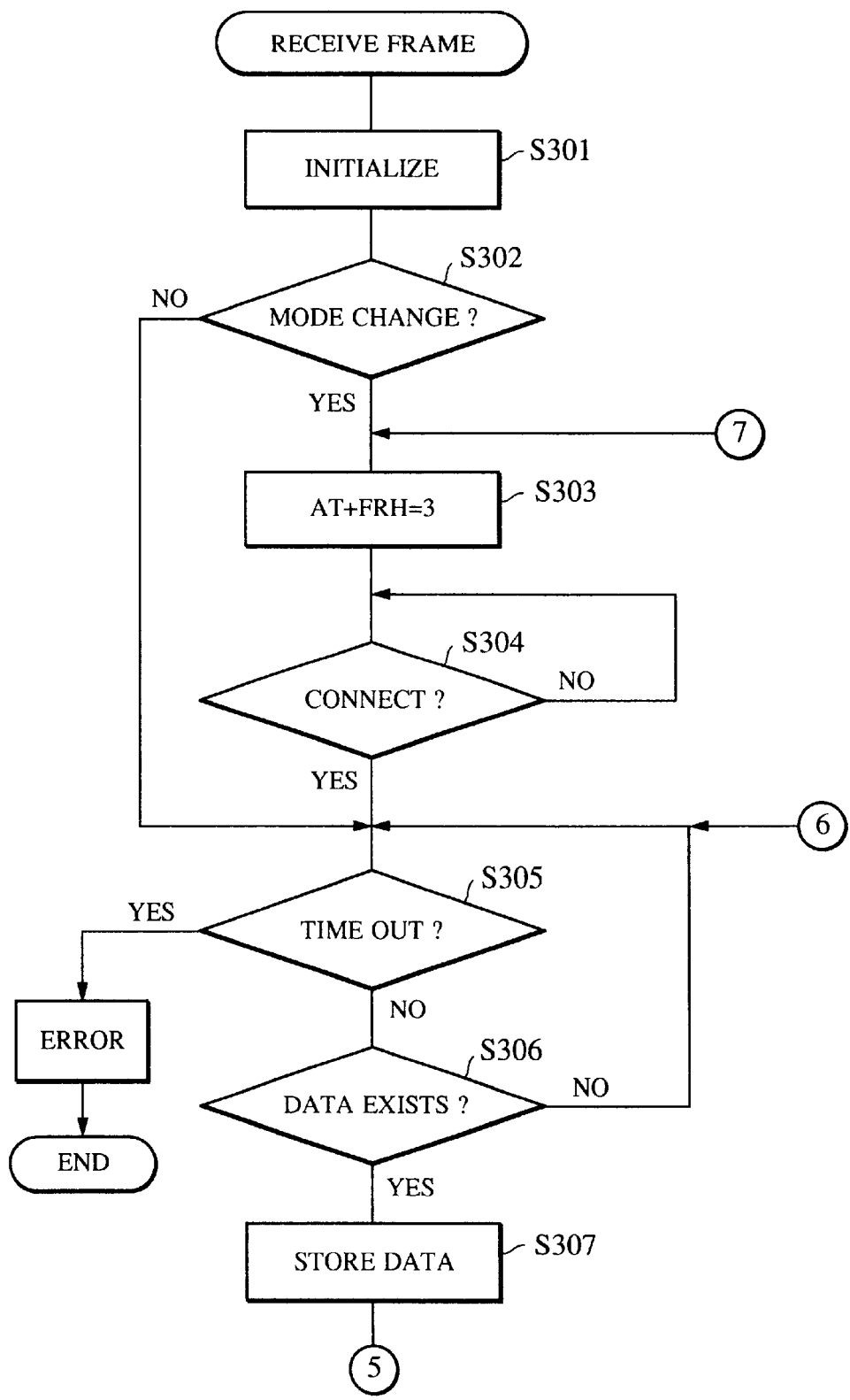
Figure 11:
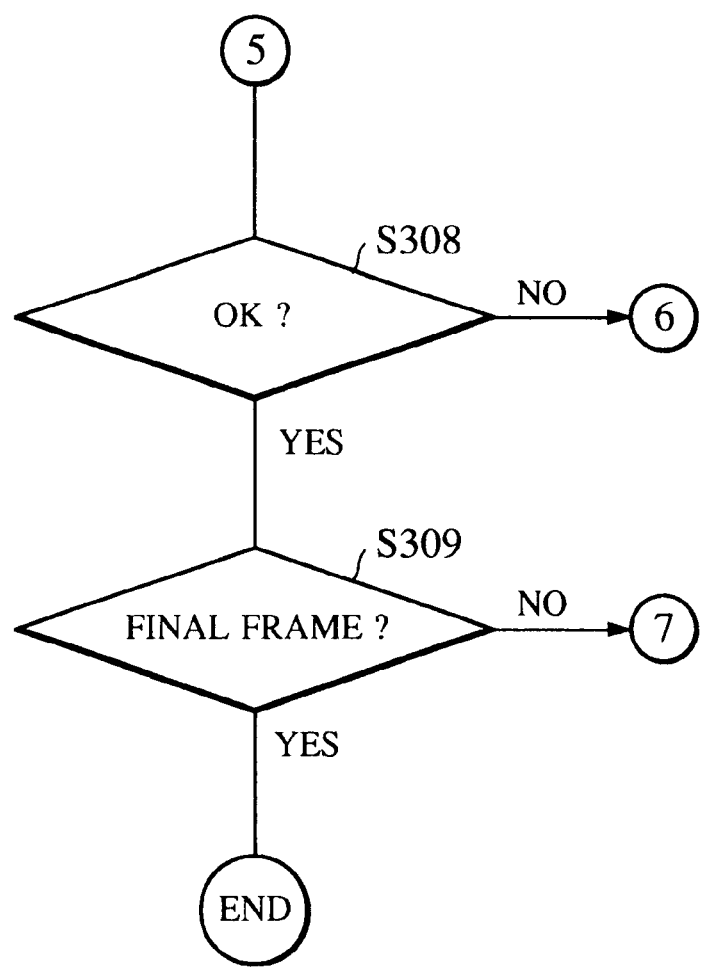

FIGS. 10 and 11 show a flow chart of the frame receipt operation. The flow of the frame receipt operation will now be described with reference to FIGS. 10 and 11.

When the frame receipt operation starts, the register of the MODEM card 115 is initialized in step S301. In step S302 whether or not the operation mode is changed, is detected. If the operation mode is changed, then a command AT+FRH=3 for causing a receipt mode ITU-T V.21 (300 bps) to be performed is transmitted to the MODEM card 115 in step S303. In step S304 a response indicating "CONNECT" from the MODEM card 115 is detected. If CONNECT has been detected or if the mode has not been changed in step S302, then receipt of frame data is waited for. If no frame data is received within a predetermined time and time out has been detected in step S305, then a discrimination that an error has taken place is made and, the circuit is disconnected. Thus, the operation is completed as an erroneous operation. In step S306 a detection is made as to whether or not frame data has been supplied. If no frame data has been supplied, the operation returns to step S305. If frame data has been supplied, then frame data is stored in the RAM 103 in step S307. After frame data has been stored, a response "OK" from the MODEM card 115 is detected in step S308. If the response "OK" has been detected, then whether or not the received frame data is the final frame is detected in step S309. If the received frame data is not the final frame, the operation returns to step S303. If it is the final frame, then the frame receipt operation is completed. The process ensuing after step S305 is repeated until the response "OK" from the MODEM card 115 is detected.

The operation returns to FIG. 4 such that whether or not the final frame received in the frame receipt operation in step S104 is a DIS (Digital Identification Signal), is confirmed in step S105. If the final frame is not a DIS, then a discrimination is made that an error has taken place, and the line connection is disconnected. Thus, the operation is ended. If it has been detected in step S105 that the final frame is a DIS, then preparation for transmitting a DCS (Digital Command Signal) is performed in step S106. In step S107 frame transmission starts.

Figure 12:
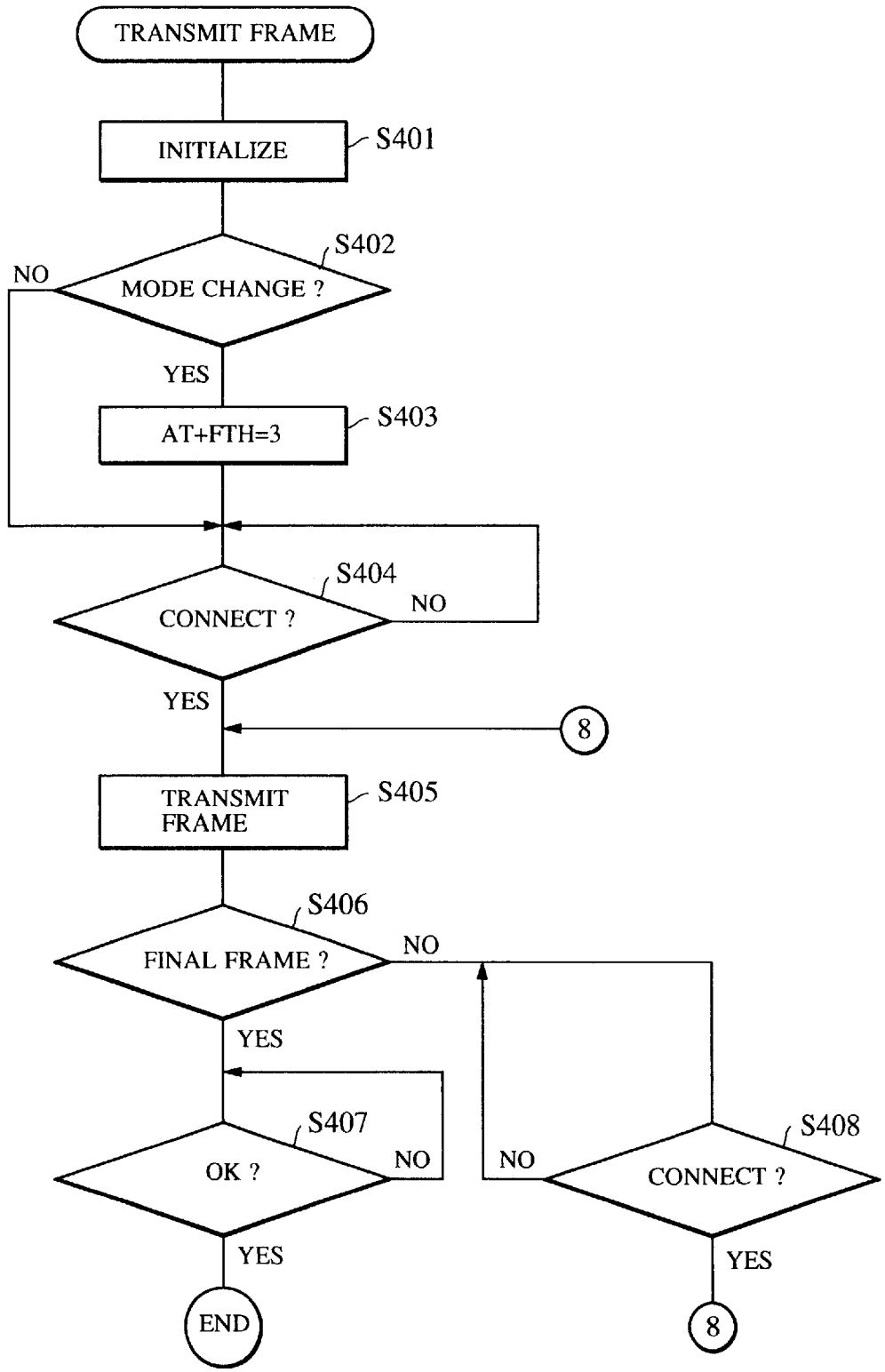

FIG. 12 is a flow chart showing the flow of the operation to be performed in the frame transmission in step S107. The flow of the frame transmission operation will now be described with reference to FIG. 12.

When the frame transmission has started, the register of the MODEM card 115 is initialized in step S401. In step S402 a detection is performed as to whether or not the operation mode is changed. If the operation mode is changed, then the command AT+FTH=3 is, in step S403, transmitted to the MODEM card 115 to cause the operation to be performed in the transmission mode ITU-T V.21 (300 bps). After the operation indicated in step S403, or if the mode is not changed in step S402, a response "CONNECT" from the MODEM card 115 is detected in step S404. In step S405 frame transmission is performed. In step S406 a detection is performed as to whether or not the frame is the final frame. If the frame is not the final frame, then the response "CONNECT" from the MODEM card 115 is detected and the operation returns to step S405. If the frame is the final frame, a response "OK" from the MODEM card 115 is detected in step S407, and the frame transmission operation is completed.

The operation returns to FIG. 4. After the frame transmission has been completed in step S107, a command AT+FTS=8, for instructing to wait for transmission for 80 ms, is transmitted to the MODEM card 115 in step S108. In step S109 the response "OK" from the card is detected. After the response "OK" has been detected, preparation for transmitting TCF (Training Check) data is performed in step S110. In step S111 high-speed transmission of TCF data starts.

Figure 13:
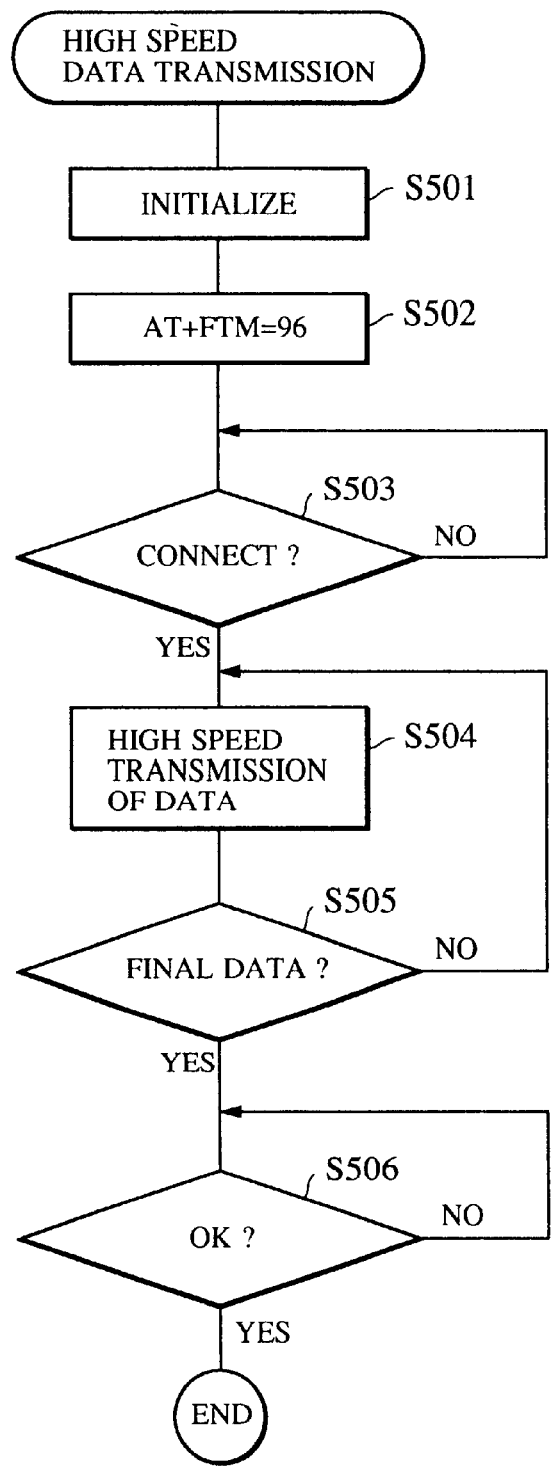

FIG. 13 is a flow chart showing the flow of the operation of the high speed data transmission in step S111. The flow of the high speed data transmission operation will now be described with reference to FIG. 13.

When high speed data transmission has started, the register of the MODEM card 115 is initialized in step S501. In step S502 a command AT+FTM=96 for instructing the transmission mode of ITU-T V.29 (9600 bps) to be performed is transmitted to the MODEM card 115. Although the transmission mode of 9600 bps is employed in this embodiment, a command AT+FTM=n (n=24, 48, 72 or 96) may be transmitted to be adaptable to the function (n×100 bps) of the connected station identified in accordance with the DIS. In step S503 the response "CONNECT" from the MODEM card 115 is detected. In step S504 high speed data transmission is performed. In step S505 whether or not the frame is the final frame, is detected. After the final frame has been detected, the response "OK" from the MODEM card 115 is detected in step S506. Then, the high speed data transmission operation is completed.

The operation returns to FIG. 5. After the high speed transmission of TCF data has been completed in step S111, frame receipt is, in step S112, performed by the same procedure as that shown in FIGS. 10 and 11. In step S113 CFR (Confirmation to Receive) is performed. In step S114 preparation for transmitting picture information data read from the RAM 103 is performed. In step S115 high speed transmission of picture information data starts by the same procedure as that shown in FIG. 13. After the picture information has been transmitted at high speed, preparation for transmitting EOP (End of Procedure) data is performed in step S116. In step S117 frame transmission of the EOP starts by the same procedure as that shown in FIG. 12. After the EOP has been frame-transmitted, frame-receipt is, in step S118, performed by the same procedure as that shown in FIGS. 10 and 11. In step S119 MCF (Message Confirmation) is performed, and then preparation for transmitting DCN (Disconnect) data is performed in step S120. In step S121 frame transmission of DCN starts. (The frame transmission for DCN is performed by the same procedure as that shown in FIG. 12.) Then, a command "ATHO" for instructing to disconnect the line is transmitted to the MODEM card 115 in step S122. In step S123 a response "OK" from the card is detected, and then the facsimile transmission operation is completed.

Figure 7:
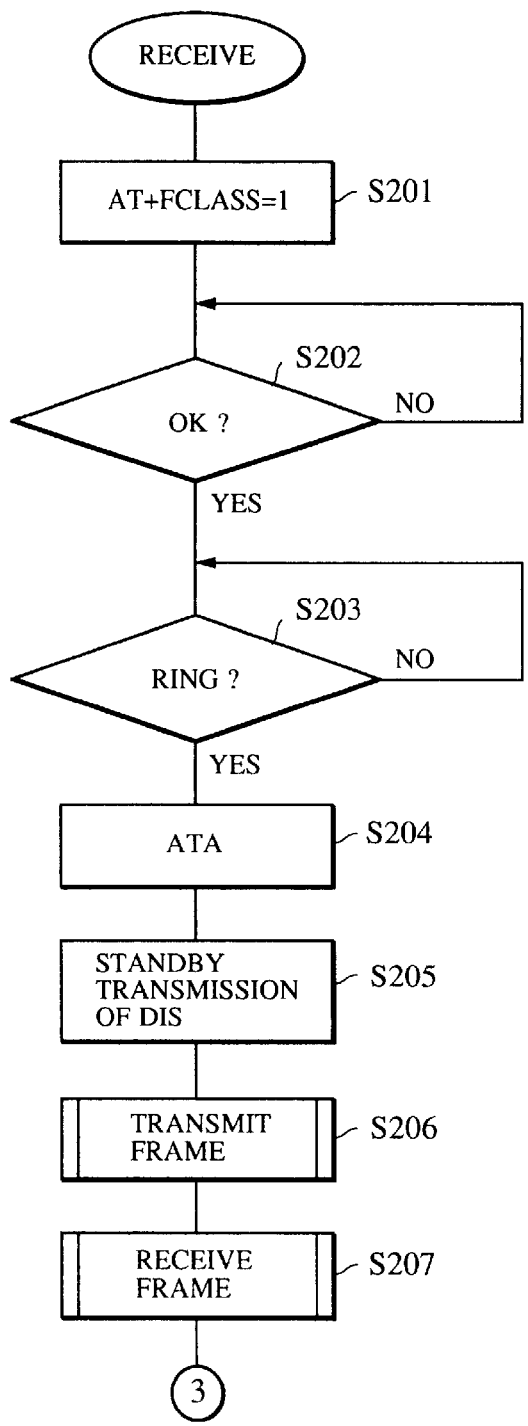
Figure 8:
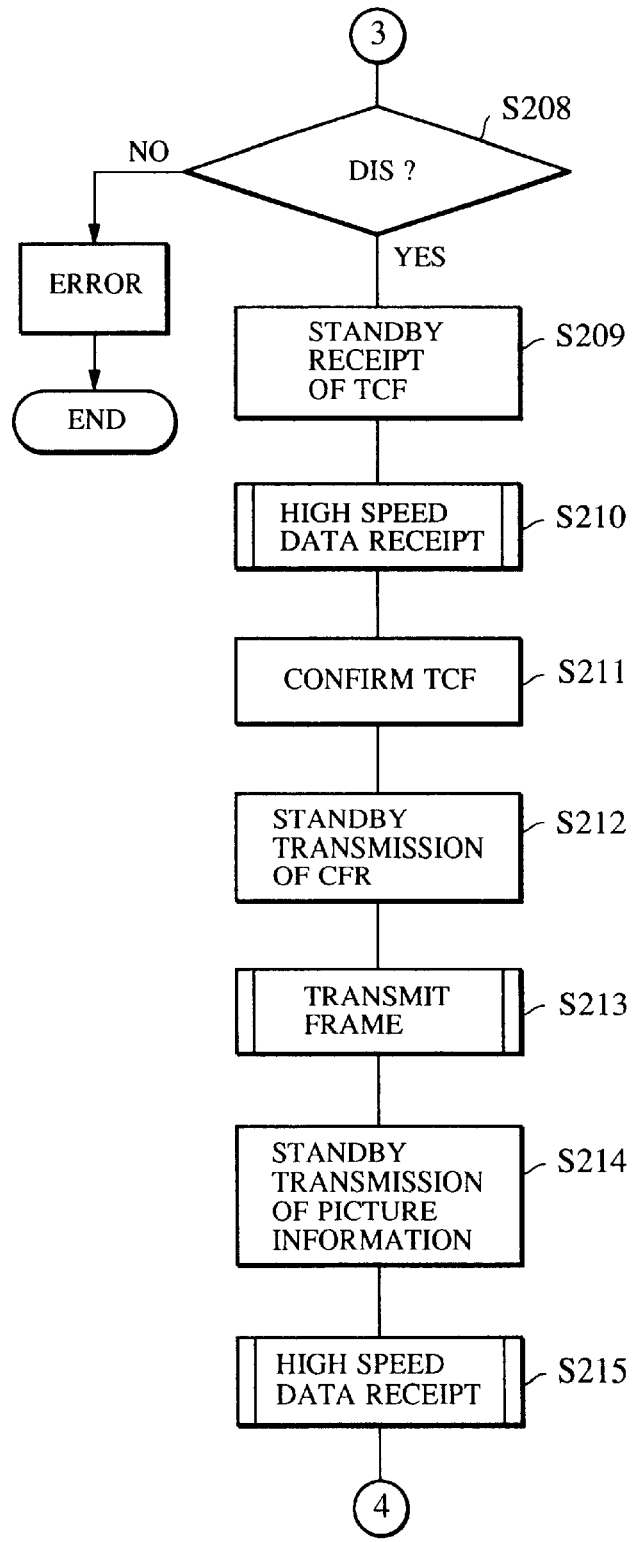
Figure 9:
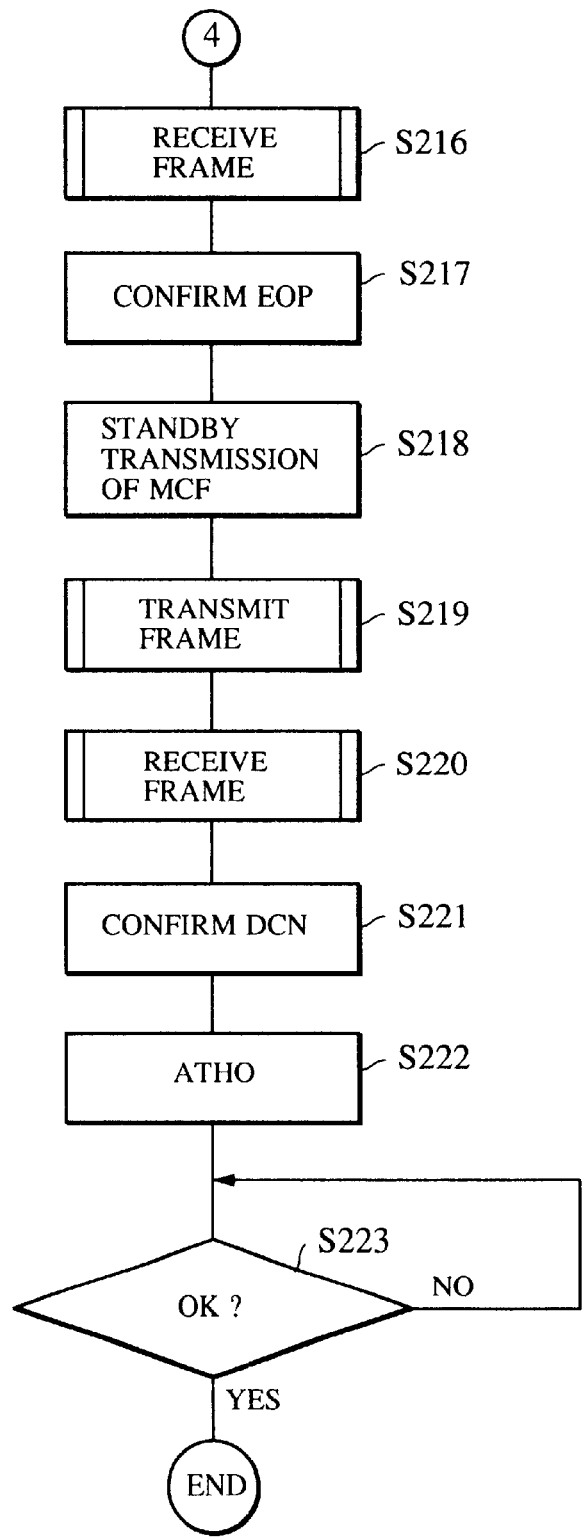

A flow chart in FIGS. 7 to 9 shows the facsimile receipt operation to be performed when a MODEM card is connected to the data communication apparatus.

In step S201 the command AT+FCLASS=1, for causing the operation to be performed in Facsimile Class 1, is transmitted to the MODEM card 115 which conforms to PCMCIA. In step S202 the response "OK" from the MODEM card 115 is detected. If the response "OK" is detected, then a response indicating detection of receipt of "RING" from the MODEM card 115 is confirmed in step S203. In step S204 a command ATA for instructing to respond is transmitted to the MODEM card 115. After the command ATA has been transmitted, preparation for transmitting DIS data is performed in step S205. In step S206 frame transmission of DIS starts by the same procedure as that shown in FIG. 12. After the DIS has been frame-transmitted, frame receipt is performed in step S207 by the same procedure as that shown in FIGS. 10 and 11. In step S208 a detection is made as to whether or not the final frame is a DCS is detected. If a negative discrimination is made, then a discrimination that an error has taken place is made and the line is disconnected. Thus, the operation is completed. If the final frame is a DCS, then preparation for receiving TCF is performed in step S209. In step S210 high speed data receipt of TCF starts.

Figure 14:
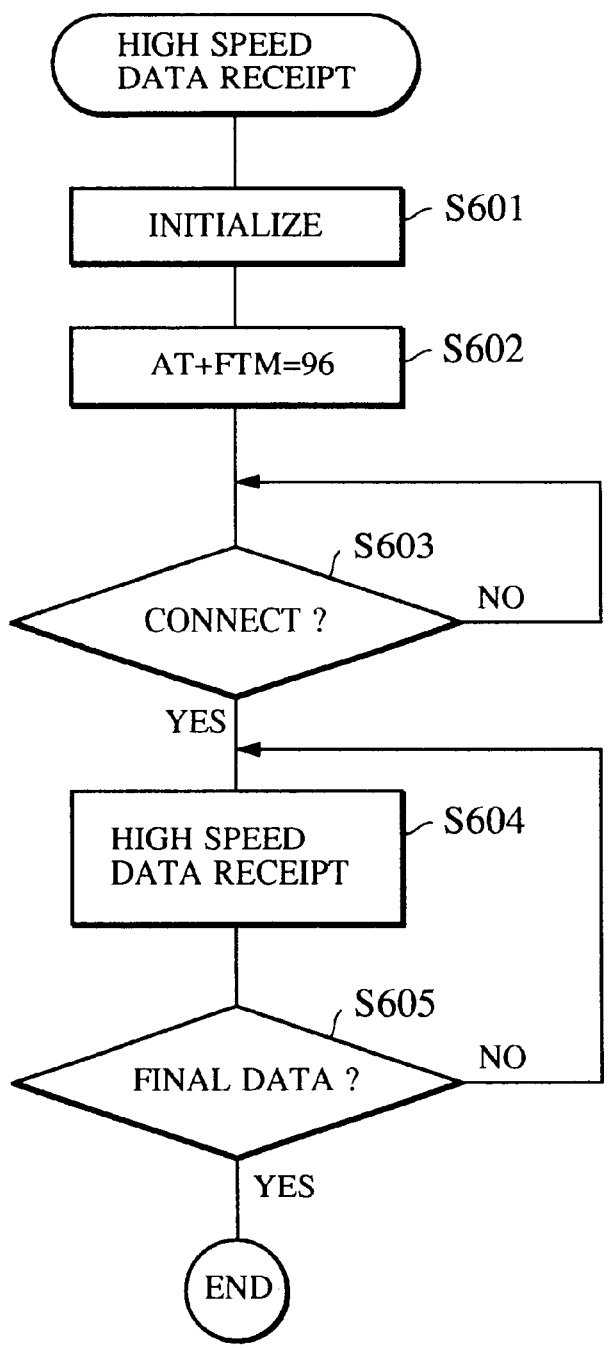

FIG. 14 is a flow cart showing the flow of the operation of the high speed data receipt in step S210. The flow of the high speed data receipt operation will now be described with reference to FIG. 14.

When the high speed data receipt has started, the register of the MODEM card 115 is initialized in step S601. In step S602 a command AT+FRM=96 for causing the operation to be performed in the receipt mode of ITU-T V.29 (9600 bps) is transmitted to the MODEM card 115. Although the receipt mode of 9600 bps is employed in this embodiment, a command AT+FRM=n (n=24, 48, 72 or 96) may be transmitted to receive data with n×100 bps to be adaptable to the state of the line. In step S603 a response "CONNECT" from the MODEM card 115 is detected. In step S604 high speed data receipt is performed. In step S605 a detection is made as to whether or not the frame is the final frame. After the final frame has been detected, the high speed data receipt operation is completed.

Referring back to FIG. 8, the high speed data receipt is completed in step S210. In step S211 TCF is confirmed, and then preparation for transmitting CFR data is performed in step S212. In step S213 CFR is frame-transmitted by the same procedure as that shown in FIG. 12. After the CFR has been frame-transmitted, receipt of picture information is set in step S214. In step S215 high speed receipt of picture information starts by the same procedure as that shown in FIG. 14. After picture information data has been received at high speed, frame receipt starts by the same procedure as that shown in FIGS. 10 and 11, in step S216. In step S217 EOP is confirmed, and then preparation for transmitting MCF data is performed in step S218. In step S219 frame transmission of MCF starts by the same procedure as that shown in FIG. 12. After the MCF has been frame-transmitted, frame receipt starts in step S220 by the same procedure as that shown in FIGS. 10 and 11. In step S221 DCN is confirmed. In step S222 command ATHO for disconnecting the line is transmitted to the MODEM card 115. In step S223 the response "OK" from the MODEM card 115 is detected, and then the facsimile receipt operation is completed. Received picture information data is, by the recording portion 110, sequentially printed out on the recording paper.

The operation to be performed when the data communication apparatus according to this embodiment is used as a printer will now be described with reference to FIG. 16.

Figure 16:
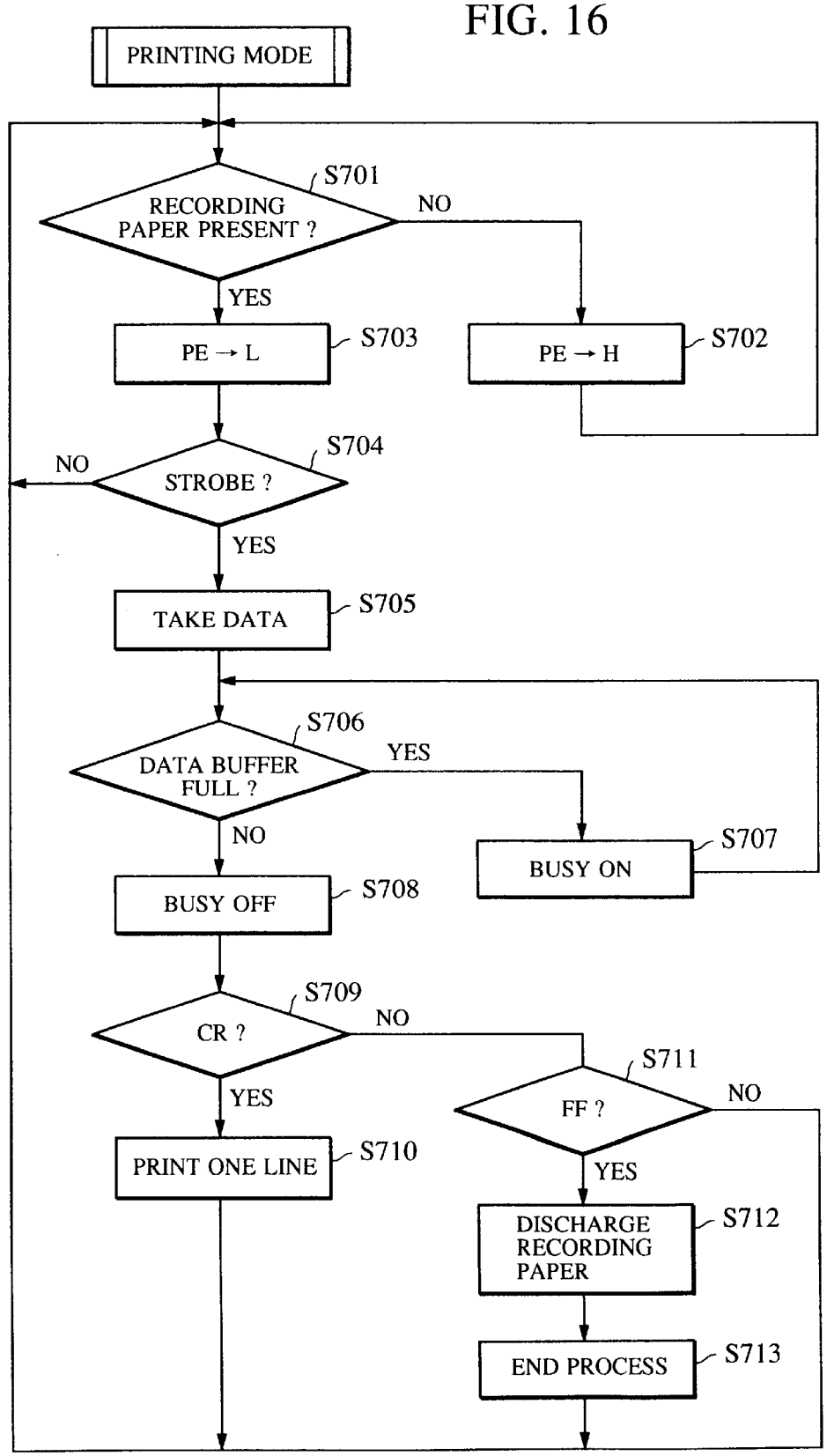

A flow chart shown in FIG. 16 shows the flow of the operation to be performed when a printer interface card is connected to the data communication apparatus according to this embodiment and data from a personal computer is recorded.

In step S701 a detection is made as to whether or not recording paper is present in the recording portion 110. If no recording paper is present, then the level of signal PE is raised in step S702 to notify the connected personal computer that no recording paper is present. If recording paper is present, the level of the signal PE is lowered in step S703 to notify the personal computer that recording paper is present. In step S704 supply of the STROBE signal from the personal computer is waited for. If the STROBE signal has been supplied, data on a data bus is introduced in step S705 to store the same in a recording memory.

In step S706 a discrimination is performed as to whether or not the recording memory is full. If it is full, a BUSY signal is, in step S707, turned on to notify the personal computer that data to be recorded cannot be received. If the recording memory is not full, the BUSY signal is turned off in step S708. If received data indicates CR (Carriage Return) in step S709, then data for one line is printed in step S710. In step S704, then, supply of the next data is waited for.

If data supplied in step S705 indicates FF in step S711, then a discrimination of page end is made and printing is completed. In step S712 the recording paper on which data has been recorded is discharged. In step S713 other processes to be performed after printing are performed. In step S704, then, supply of the next data is waited for.

Although the foregoing description has been provided about the case where the data communication apparatus according to the present invention is used as a facsimile apparatus or a printing apparatus, a mobile communication device, such as a portable telephone or an automobile telephone, may be used according to the invention to perform wireless data communication. In the foregoing case, the Cellular Interface card 117 is inserted into the PCMCIA Interface portion 114, and the mobile communication device is connected to the Cellular Interface card 117.

The Cellular Interface card 117 is a connection adapter card having an interface for connecting a mobile communication device, such as a portable telephone or an automobile telephone. Similarly to the other cards, the Cellular Interface card 117 is controlled by the CPU 101 when it is inserted into the PCMCIA Interface portion 114 so as to be used in facsimile communication through a mobile communication device.

The operation is performed in the foregoing case in such a manner that the card to be detected in step S5 in the flow chart shown in FIG. 3 is replaced by the Cellular Interface card and the other processes are performed similarly. That is, if the inserted card is a Cellular Interface card in step S5, then the card is initialized in accordance with attribute information of the inserted Cellular Interface card in step S6. Then, a similar operation is performed, and thus the description of the similar operation is omitted here.

Figure 17:
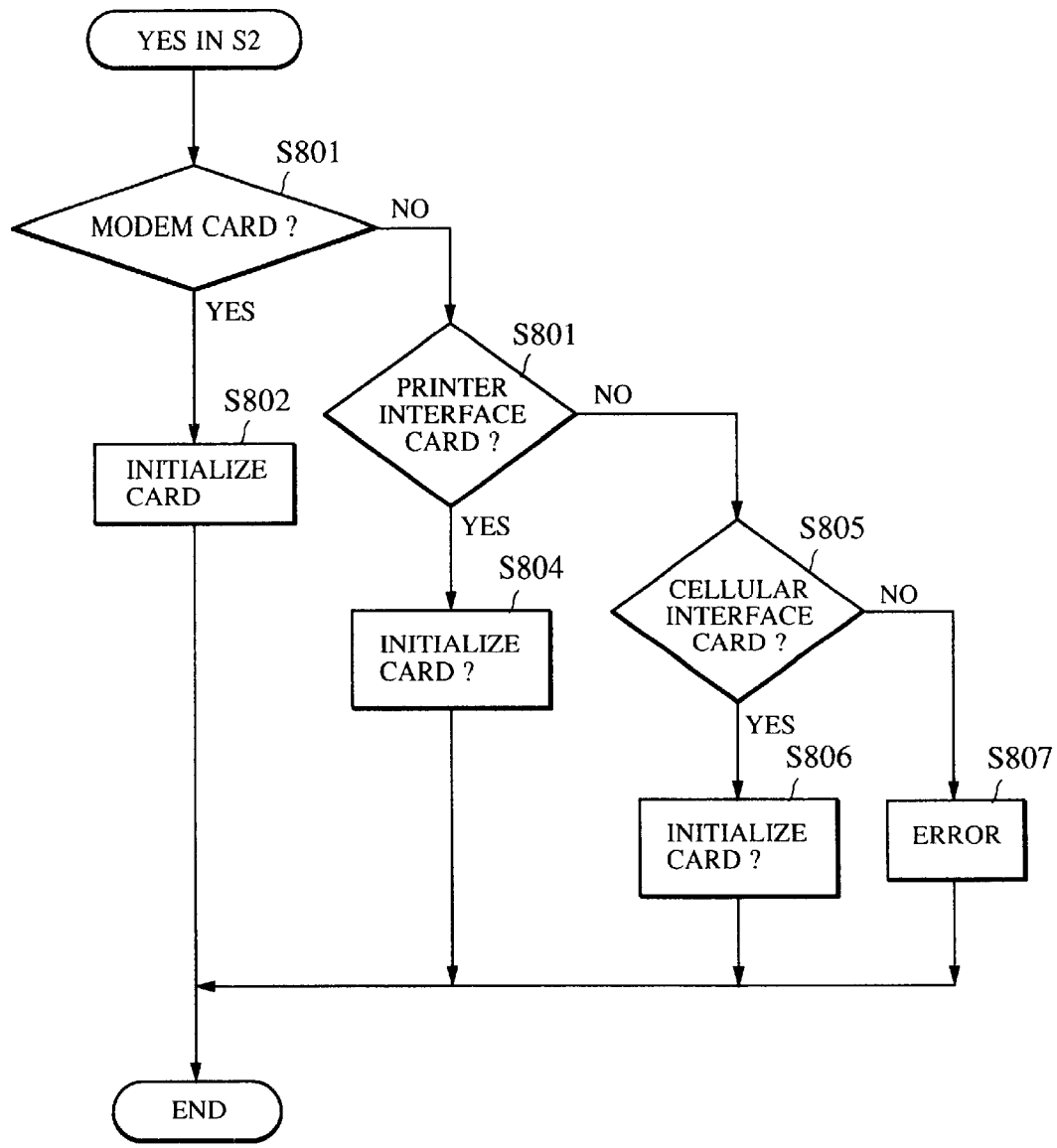

As a matter of course, three types of cards, the MODEM card, the printer interface card and the Cellular Interface card, can be used selectively. Furthermore, the structure according to the present invention is able to be used with various types of cards. As an example, a flow chart in which steps S3 to S7 shown in FIG. 3 are changed to steps S801 to S807 is shown in FIG. 17 to be adaptable to the case where the foregoing three types of cards are used selectively. Note that other types of cards can be used by following this flow chart mutatis mutandis.

As described above, the apparatus according to the present invention has the arrangement that the attribute of the inserted card is identified and the program corresponding to the attribute of the card is activated so as to be operated as a facsimile apparatus, a printing apparatus or a wireless communication apparatus. Since the common card interface is employed, the size and weight of the apparatus can easily be reduced. Furthermore, the card interface has the shape and the pin configuration that conform to the PCMCIA, and therefore compatibility can be realized.

Although the printer interface, the subscriber's line and the mobile communication device are commonly controlled with the same AT command in this embodiment, the inserted card can be discriminated when the card has been inserted or power has been supplied and a command system adaptable to the inserted card may be used in the control. For example, the command system of each PCMCIA card is previously stored in the card or the ROM 102; and when the inserted PCMCIA card can be identified or at another moment the command system is loaded into the RAM 103 to control the inserted PCMCIA Interface card.

Although PCMCIA has been described as the connection standard for the changeable communication module, it is apparent that the present invention is not limited to the foregoing standard.

In addition, although the foregoing embodiment employs the communication module for a printer, a communication module for a subscriber's line and a communication module for a mobile communication device, the present invention is not limited to the foregoing communication modules. For example, a communication module for an ISDN line may be employed or either analog or digital communication module for a mobile communication line may be employed. In this case, the control corresponding to each communication module is required.

Also, although this embodiment uses the image data communication apparatus, the present invention is not limited to image communication, but can also be employed in communication of other information, for example, sound.

Second Embodiment

The description of this embodiment will be made with reference to a case where the card interface is applied to be adaptable to line specifications that are generally different among countries or regions.

Figure 18:
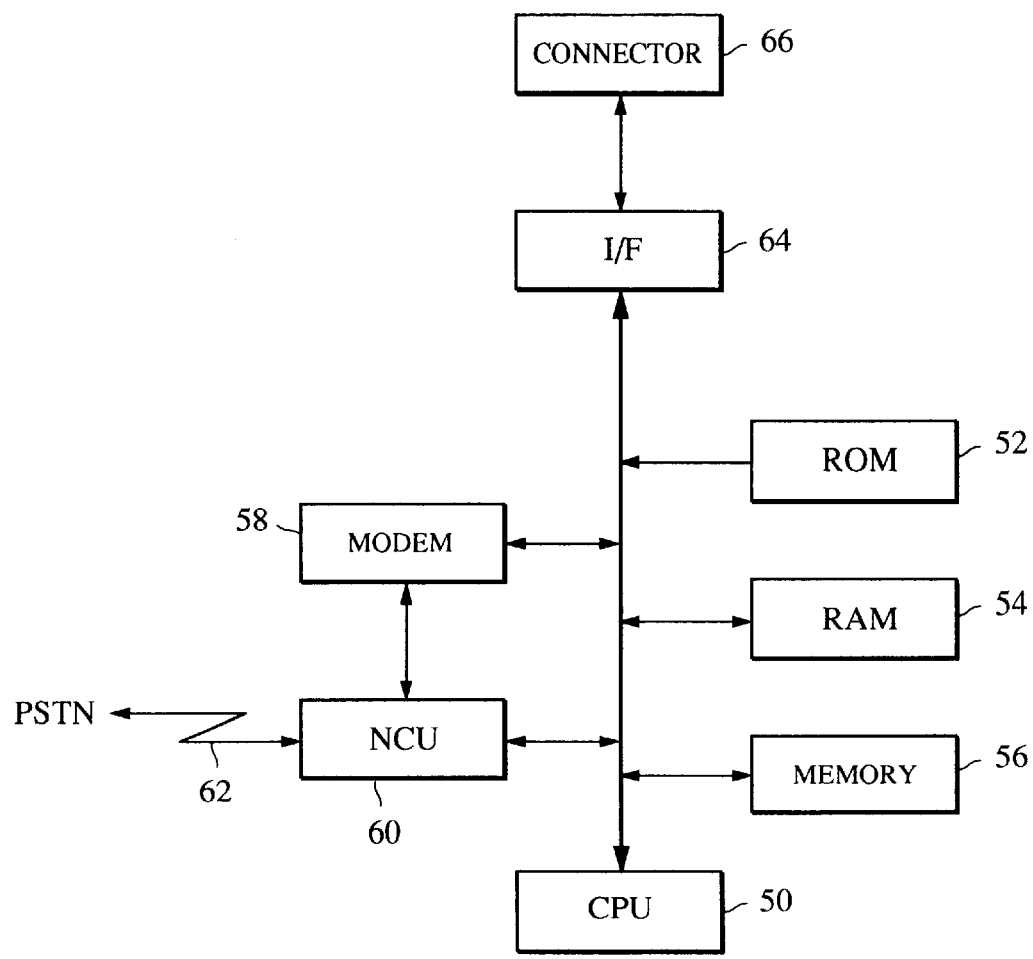

FIG. 18 is a schematic block diagram showing the structure of a communication card (the MODEM card 115) to be connected to the PCMCIA Interface portion 114 shown in FIG. 1. A CPU 50 controls each portion of the circuit shown in FIG. 18, that is, a RAM 54, a memory 56, a modem (a modulator and demodulator) 58, a network control unit (NCU) 60 and an interface 64 in accordance with a program stored in the ROM 52.

Each of the foregoing elements will now be described. The RAM 54 temporarily stores data received from a PSTN 62 through an NCU 60 and, as well, temporarily stores data (image data to be transmitted) supplied through the interface 64 from the body (see FIG. 1) to be connected to an external connector 66.

The memory 56 is a non-volatile data storage means backed up by battery or the like and arranged to store predetermined information, for example, information for specifying the card function, such as card attribute information, date, abbreviated name of the user, telephone number of the user and so forth, regardless of whether or not power is being supplied to the body of the apparatus.

The modem 58 comprises a modulator and demodulator circuit adaptable to G3, G2 and G1 facsimile apparatuses, an old FM modulator and demodulator circuit and/or a data modulator and demodulator circuit and a clock generating circuit for generating clocks to be supplied to the foregoing modulator and demodulator circuits. The modem 58, under control of the CPU 50, modulates transmission data stored in the RAM 54 to transmit it to the subscriber's line PSTN 62 through the NCU 60. The modem 58 binary-codes data supplied from the subscriber's line PSTN 62 to store it in the RAM 54.

The NCU 60 has a known structure comprising a DC capturing circuit, a 2-line/4-line conversion circuit, a receiving circuit, a circuit for detecting a variety of signals, and a line switching circuit. The NCU 60 supplies a signal from the subscriber's line PSTN 62 to the modem 58 and transmits a signal from the modem 58 to the subscriber's line PSTN 62.

The interface 64 has a controller of the interface which conforms to the PCMCIA Interface standard, the interface 64 comprising a connector 66 to be connected to a connector of the body which is adapted to PCMCIA. In cooperation with the interface 36 of the body of the apparatus, the interface 64 transmits card attribute information of the circuit shown in FIG. 18 to the body of the apparatus and receives information about a variety of setting to transfer the same to the CPU 50 and so forth.

Figure 19:
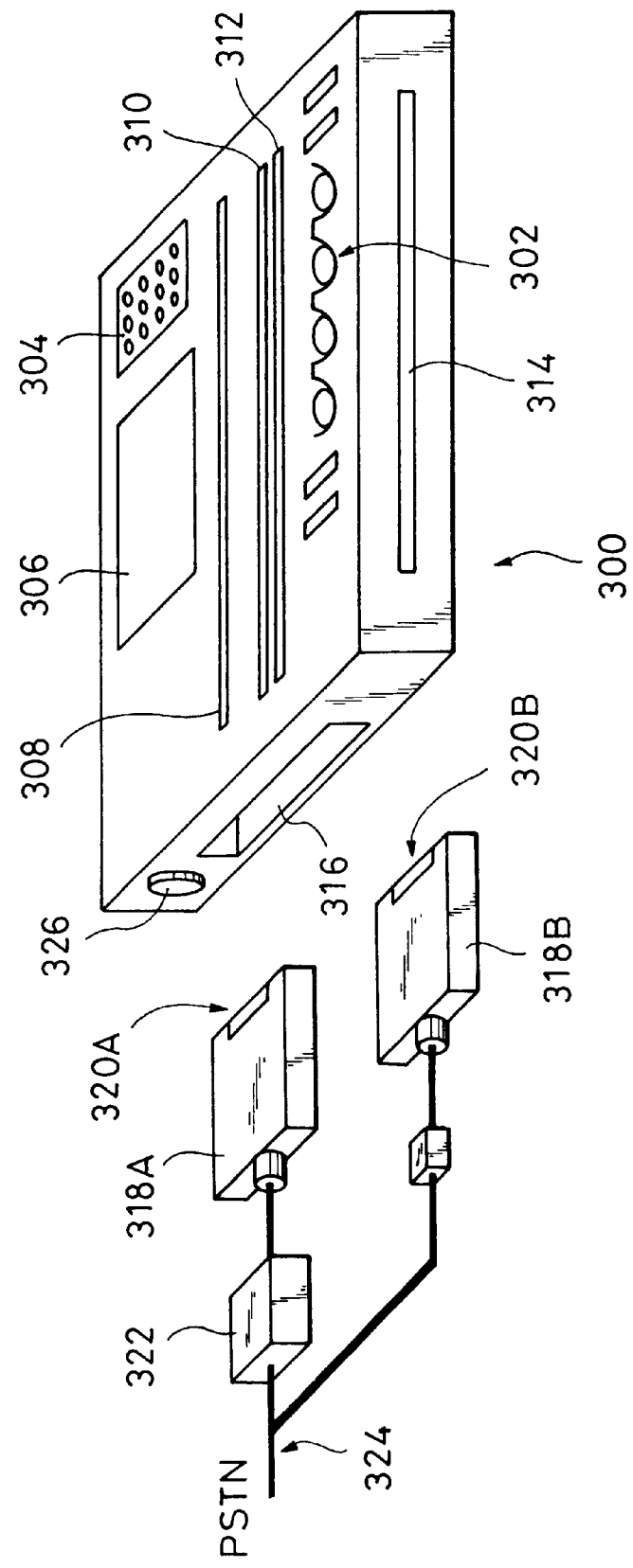
FIG. 19 is a perspective view showing the appearance of the data processing apparatus according to this embodiment of the present invention.

FIG. 19 shows the shape of the data communication apparatus according to this embodiment. The body 300 of the apparatus according to this embodiment is formed as a portable body having a small size. The body 300 has an internal circuit having functions as indicated in the block diagram shown in FIG. 1. A control switch group 302 and a ten key pad 304 are included in the operation portion 104. A display portion 306 corresponds to the display portion 105. Recording paper to be printed in the recording portion 110 is inserted through a recording-paper insertion port 308 and discharged through the recording-paper discharge port 310 after printing. An original document, the image of which is read by the reading portion 109, is inserted through an original-document insertion port 312 and discharged through an original-document discharge port 314 after the original document has been read. An external connection slot 316 includes the PCMCIA Interface portion 114 to enable two communication cards (modem cards in this embodiment) 318A and 318B to be connected. The cards 318A and 318B respectively have connectors 320A and 320B corresponding to the connector 66 shown in FIG. 18.

Although the communication card 318A has no NCU, the communication card 318B includes an NCU. Therefore, the communication card 318A can be connected to a subscriber's line PSTN 324 (the PSTN 62 shown in FIG. 18) through an NCU 322. The communication card 318B can be directly connected to the subscriber's line PSTN 324. The NCU 322 comprises a DC capturing circuit, a 2-line/4-line conversion circuit, a receiving circuit and a circuit for detecting a variety of signals.

In this embodiment, a variety of communication cards, such as the communication cards 318A and 318B, that are adapted to PCMCIA, are prepared to correspond to the connected lines and countries.

The body 300 further comprises a power switch 326 on the side surface thereof.

The operation of this embodiment having the above-mentioned structure will now be described in detail with reference to a flow chart. A program adapted to the foregoing procedure is stored in the ROM 102 shown in FIG. 1 as an execution program for the CPU 101.

Figure 20:
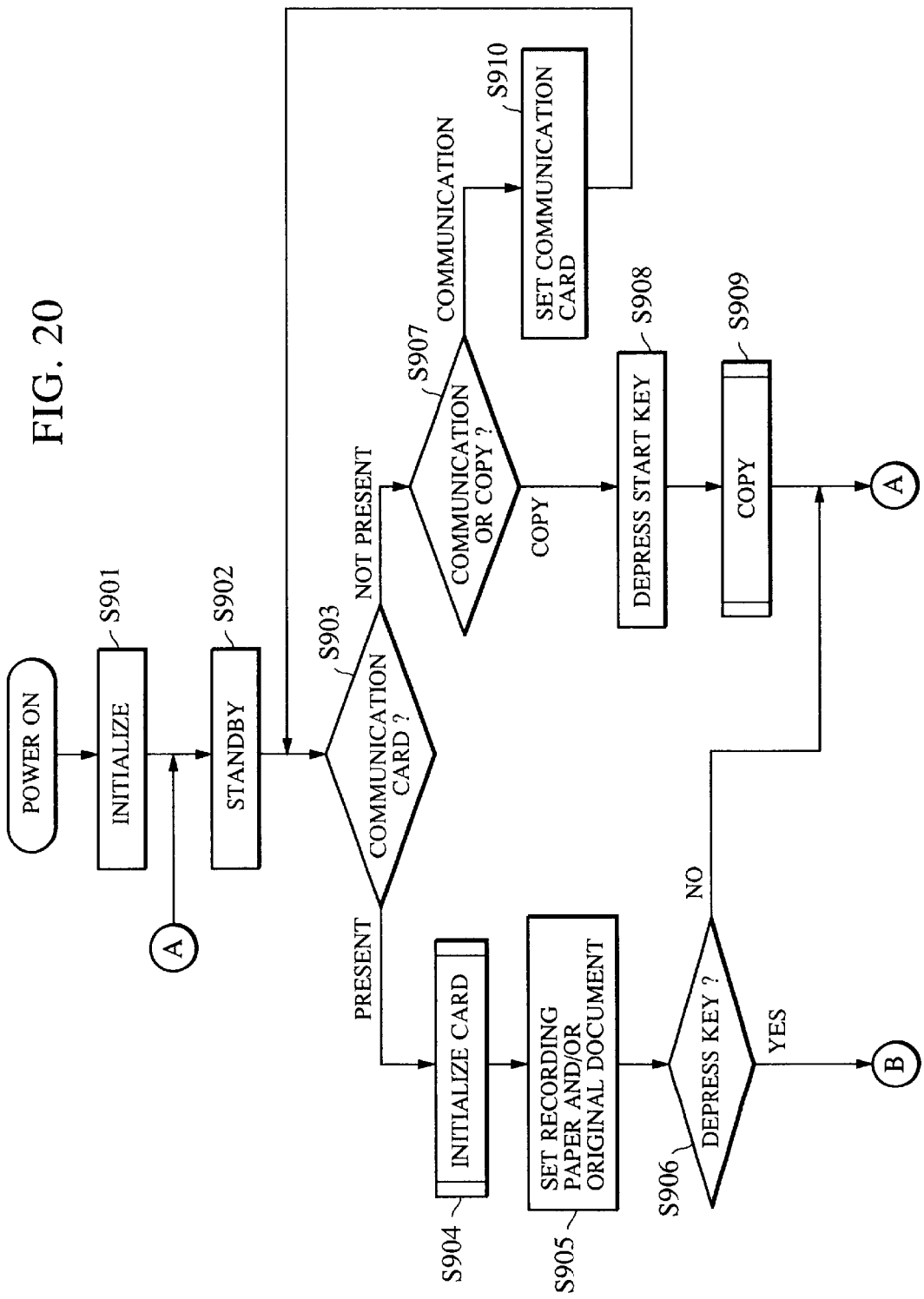
Figure 21:
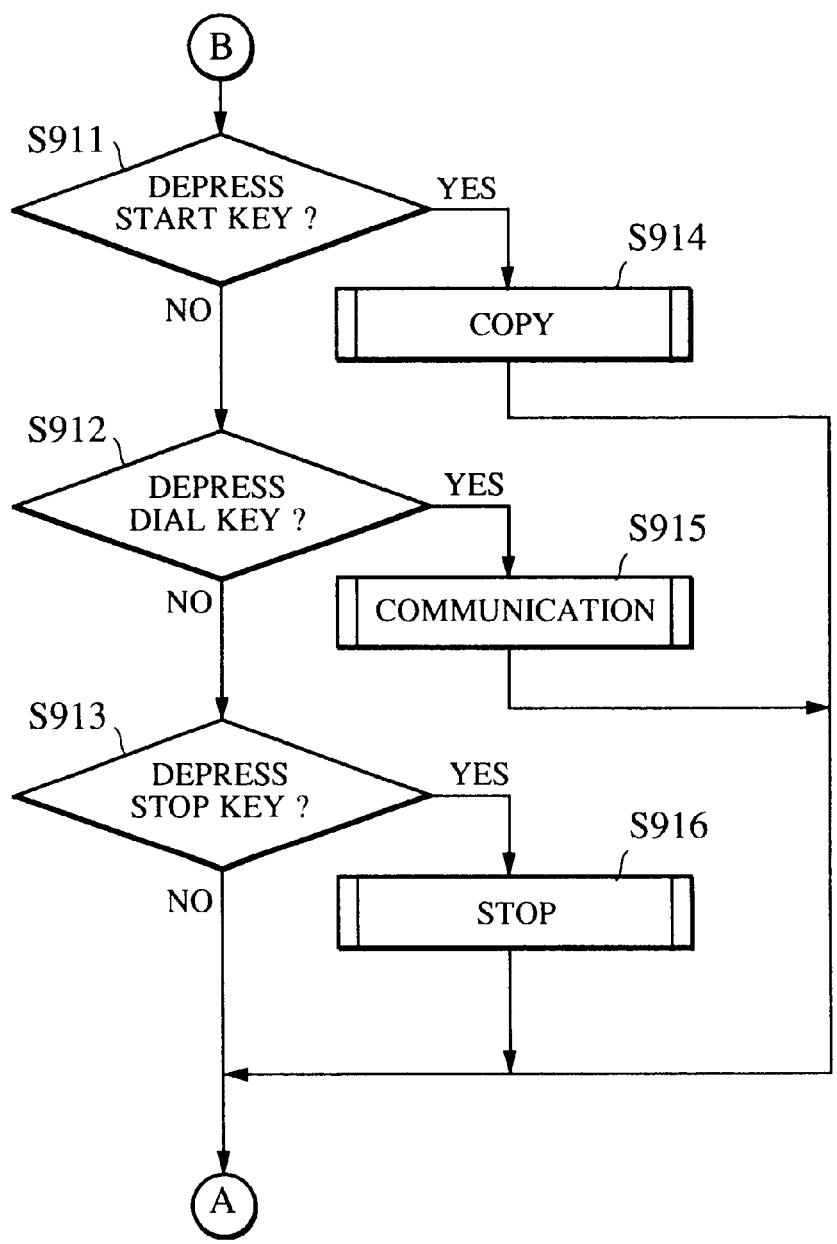

As shown in the flow chart shown in FIG. 20, the apparatus is initialized (S901), and then standby mode starts (S902). Whether or not a communication card is present is examined (S903). If no communication card is present, and as well a command for communication from a user is made (S907), setting of a communication card is urged through the display portion 105 or the like (S910). If a command for copying is issued (S907), the start key is depressed (S908) and copying is performed (S909). After the copying operation has been completed, the operation returns to step S902 so that the standby state is resumed.

If a communication card is present (S903), the connected communication card is initialized (S904) and recording paper and/or original document is set (S905). If no key is depressed within a predetermined period (S906), the operation returns to step S902, resuming standby state. If any key is depressed (S906) and, as well, the depressed key is the start key (S911), then a copying operation is executed (S914). If the depressed key is the dial key (S912), a communication operation is executed (S915). If the depressed key is the stop key (S913), a stopping operation is executed (S916). If another key is depressed, the operation returns to step S902, and the standby state is resumed.

Figure 22:
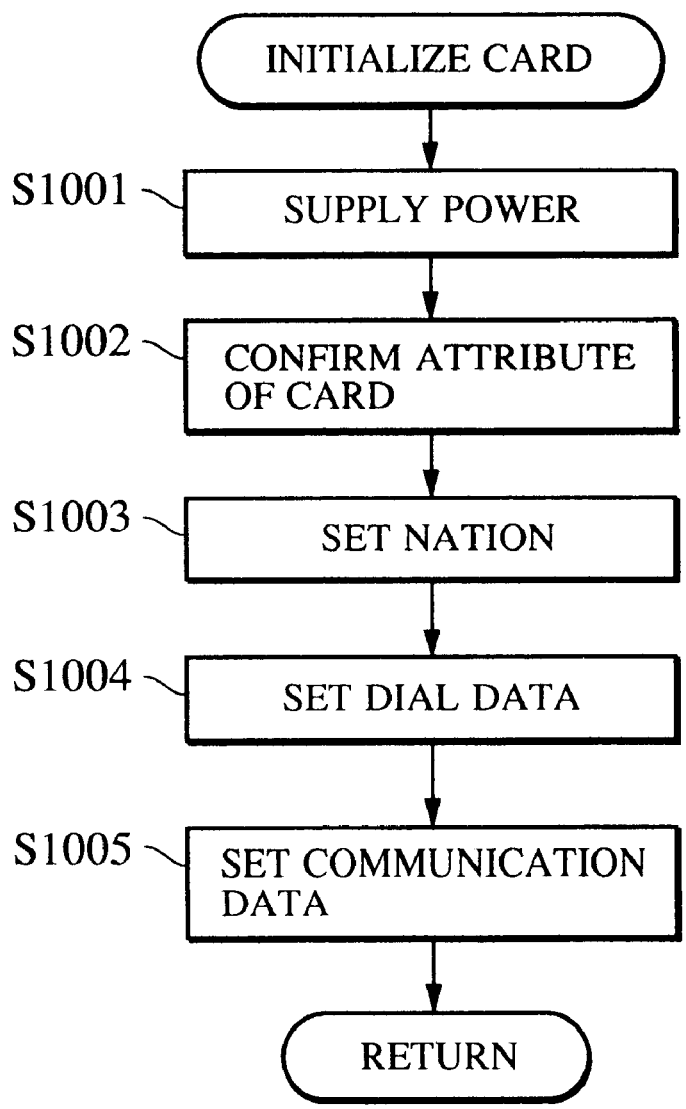

FIG. 22 shows a detailed flow chart of step S904 (see FIG. 20). The flow of the operation is performed when a communication card is connected to the body of the apparatus or power is supplied to the body of the apparatus.

When power is supplied to the communication card from the body of the apparatus (S1001), the attribute of the card is communicated to the body of the apparatus (S1002). For example, a NCU (Network Control Unit) included in or attached to a communication card #1 for a public line (the communication card 318A) has specifications employed in Japan, the United States and Canada. The NCU is adapted to communication modes, such as ITU-T recommended V.22bis, V.21, V.27ter and V29, BELL standard 212A and 103J, and also to command sets, such as Heiz AT command, ITU-T V.25bis asynchronous command, EIA578 (Class 1) command and EIA592 (Class 2) command. As a dial function, it has a DTMF transmission function and PD transmission function. As an error correction function, it has ITU-T V.42 and MNP Class 4. As a data compression function, it can be adapted to ITU-T V.42bis and MNP Class 5.

An NCU included or attached to a communication card #2 for a public line (the communication card 318B) has specifications employed in Holland, Germany and France. The NCU is adapted to communication modes, such as ITU-T recommended V.22bis, V.21, V.27ter and V29, BELL standard 212A and 103J and also to command sets, such as Heiz AT command, ITU-TV.25 bis asynchronous command, EIA578 (Class 1) command and EIA592 (Class 2) command. As a dial function, it has a DTMF transmission function and PD transmission function. As an error correction function, it has ITU-T V.42 and MNP Class 4. As a data compression function, it can be adapted to ITU-T V.42bis and MNP Class 5.

The body is notified of the foregoing functions, and the body reads information from information of a plurality of line standards stored in the ROM 102 and selects sets of required functions. When the facsimile communication is performed, a set of functions that are required to perform the facsimile operation is selected and the specifications of the selected functions are set to the communication card.

Then, countries in which the apparatus according to the present invention will be used, are set (S1003). The countries are selected and appointed from a group consisting of the countries to which the connected communication card is able to perform communication. That is, the attribute of the card is identified in step S1002, and then the countries in which the apparatus can be used, are displayed on the display portion 105 so as to be selected by the operation using the operation portion 104.

Dial data corresponding to the set country is read from the ROM 102 and set, and it is, as set information, transferred from the body to the communication card (S1004). In a case where the set country in step S223 is Japan, the high DTMF level is set to −9 dBm, the low DTMF level is set to −11 dBm, and the shortest transmission time is set to 100 ms. The make-break ratio of the DP value is set to 33.67.

Finally, communication data is set (S1005). If the set country is Japan, for example, the level of transmitting image data is set to −15 dBm, and the receipt error ratio in RTN (Retraining Negative) is set to 10%.

As a result, communication in the communication mode adapted to the standard for the country in which the apparatus will be used can be performed.

As a matter of course, when the apparatus according to the present invention is used in Holland, the communication card #2 for a public line is connected to the body of the apparatus and Holland is set as the country.

Figure 23:
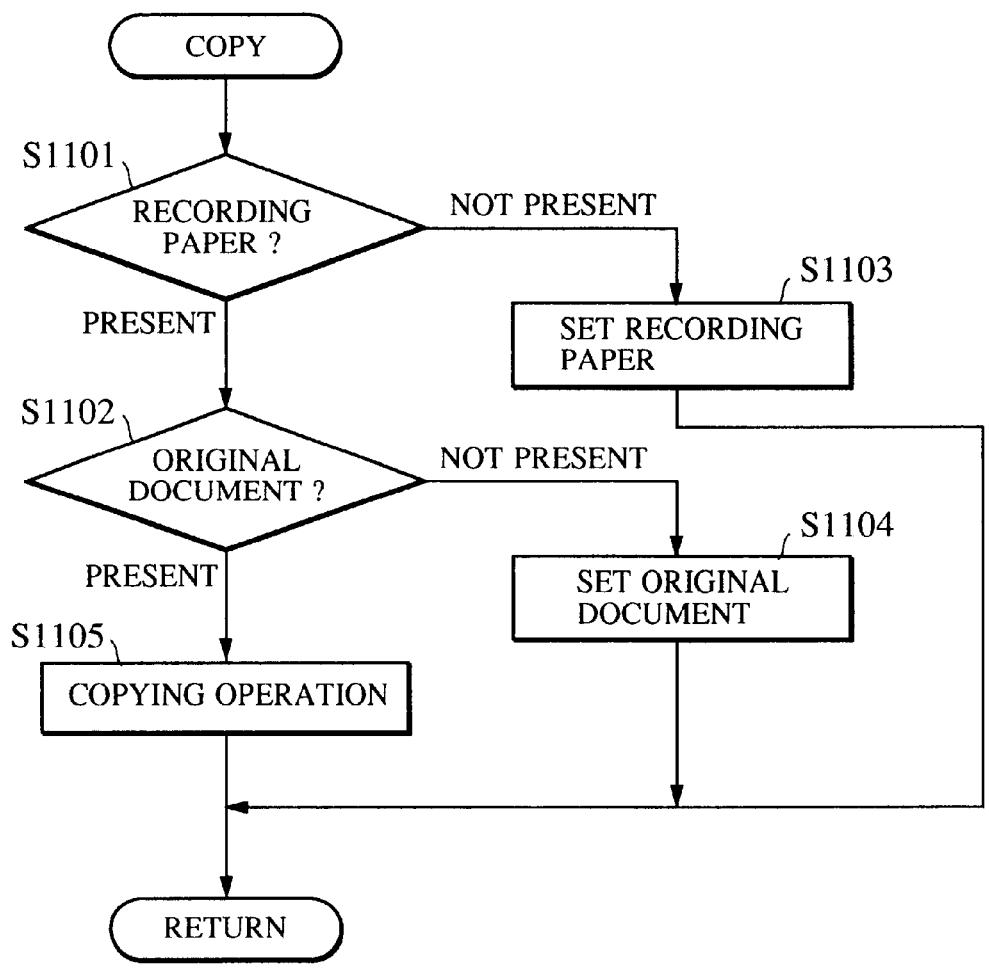

FIG. 23 is a flow chart showing the detailed copying operation in steps S909 and S914. Initially, whether or not recording paper is present, is examined (S1101). If recording paper is present, whether or not an original document is present is confirmed (S1102). If an original document is present, the copying operation is performed (S1105). If no recording paper is present (S1102), setting of recording paper is urged to a user (S1103), and the operation returns to the original position. Also, in a case where recording paper is present but no original document is present (S1102), setting of the original document is urged through the display portion 105, and the operation returns to the original position (S1104).

Figure 24:
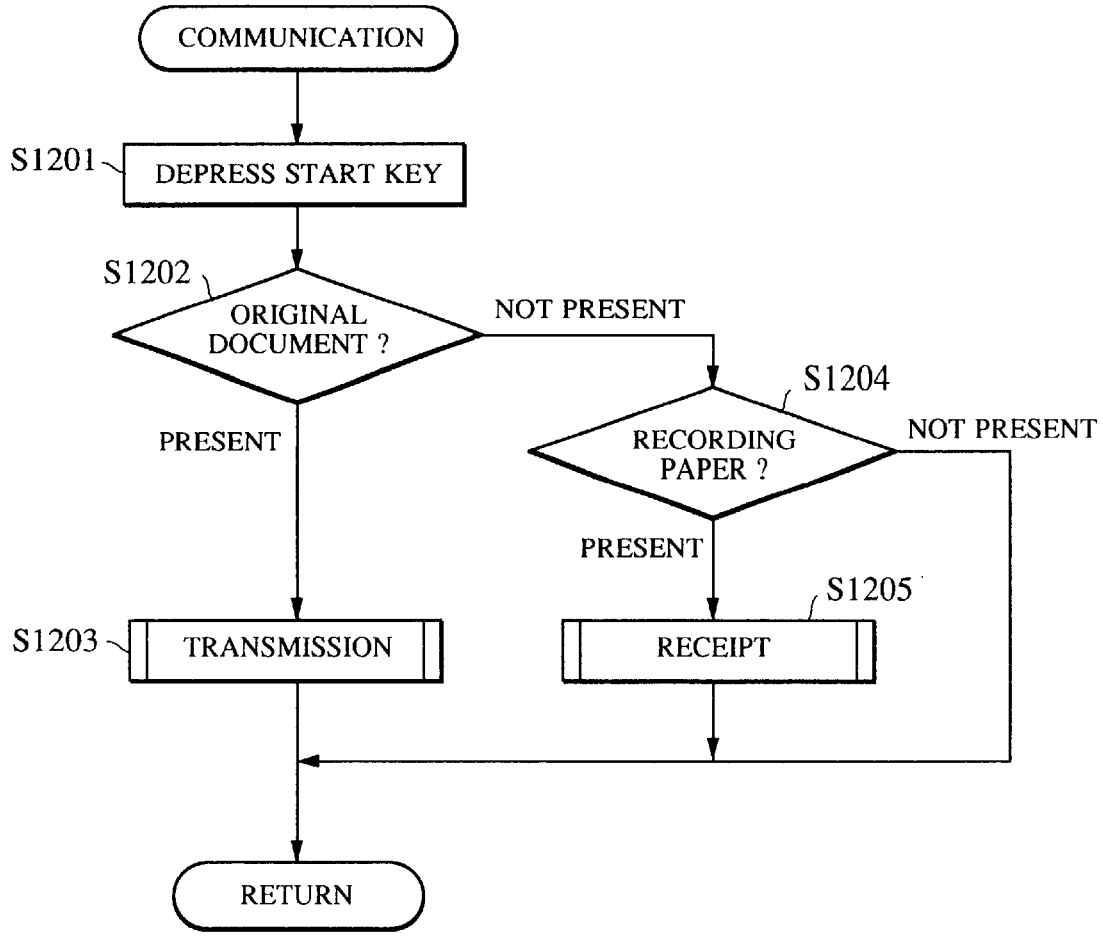

FIG. 24 is a flow chart showing the detailed communication operation in step S915. Initially, the start key is depressed (S1201), and an examination is made as to whether or not an original document is present (S1202). If an original document is present (S1202), the transmission operation is performed and the operation returns to the original position (S1203). If no original document is present (S1202), whether or not recording paper is present is examined (S1204). If recording paper is present (S1204), the receiving operation is performed and the operation returns to the original position (S1205). If no recording paper is present (S1204), no operation is performed and the operation returns to the original position.

Since the detailed flows of the facsimile transmission and receipt operations are the same as those shown in FIGS. 4 to 14, they are omitted from the description.

Figure 25:
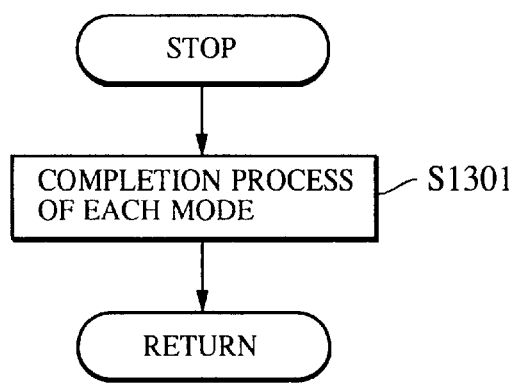

FIG. 25 is a flow chart showing the stopping operation in step S916. The state of the body of the apparatus realized when the stop key is depressed is discriminated. If the communication or copying operation is being performed, the operation is interrupted and the operation returns to the original position.

Although the body of the apparatus according to this embodiment comprises the reading portion serving as the image input means and the recording portion serving as the image output means, another structure may be employed in which image data of an original document to be transmitted is inputted from outside or it is made using document or graphic making software and stored in a hard disk apparatus or the like. It is apparent that if a storage means having a capacity sufficiently large to store received image data is provided, then the data can be received (that is, intercepted) without a necessity for causing the recording apparatus to output the data immediately. Therefore, in such case, references above to the presence of the original document and the presence of the recording paper, must be understood as meaning the presence of the image of the original document to be transmitted and the presence of empty region of a storage means for storing the received image.

Although this embodiment has the arrangement that an appropriate line specification is accommodated by the country being selected and designated by the user to choose the proper standard from a plurality thereof different from country to country (S1003), the present invention is not limited to this. For example, any one of line standards or types called A, B and C may be selected directly.

As can be easily understood from the above-mentioned description, the structure of this embodiment in which the communication unit is separated from the body of the apparatus enables the following effects to be obtained: the weight, size and the cost of the body of the apparatus can be reduced. Since the communication unit realizes adaptability to the communication functions that are different among the countries and communication systems, the body of the apparatus requires only one, or at most a small number of versions even if it is used throughout the world. Use of a general-purpose interface (for example, a PCMCIA Interface or the like) for establishing the connection between the body of the apparatus and the communication unit widens the applicable range for the communication unit and the body of the apparatus such that any of a variety of portable computers can be used as the body of the apparatus. At this time, information, such as the standard for the communication, required to perform the communication can be sent from the body of the apparatus to the card with a predetermined command. If a mobile communication card or the like is connected on the contrary, the communication conditions can be set by transmitting a command from the card to the body of the apparatus.

Third Embodiment

Figure 26:
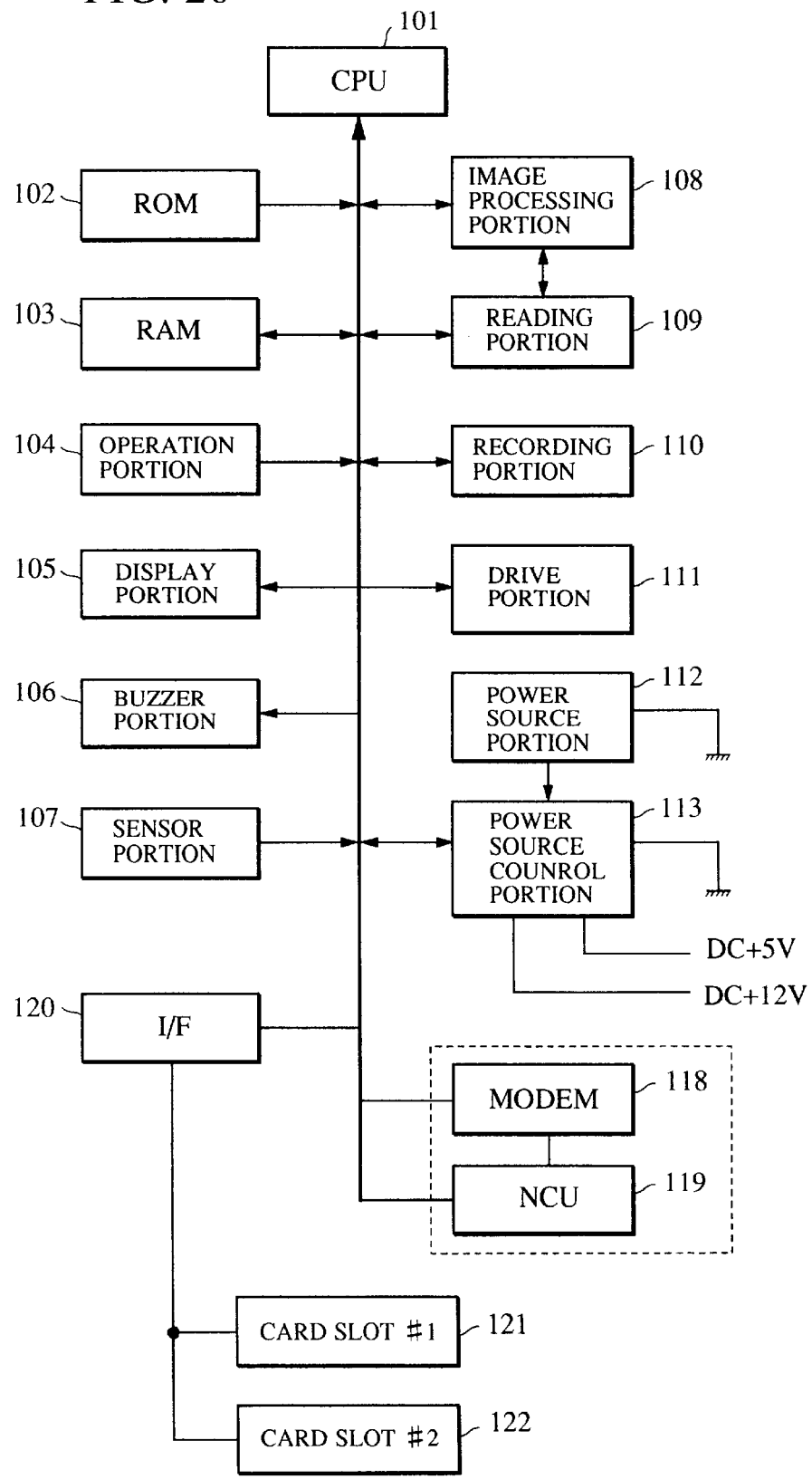

The foregoing embodiments have the arrangement that the operation is performed in accordance with the program previously stored in the ROM 102. An embodiment below has the arrangement that the operation program can be easily changed. FIG. 26 is a block diagram showing the structure of a data communication apparatus according to such third embodiment. The elements given the same reference numerals as those shown in FIG. 1 perform similar operations, and therefore are omitted from the description here.

An interface 120 has two card slots 121 and 122 so that two cards each including a circuit module having a specific function can be connected simultaneously. Since the two card slots 121 and 122 have a similar structure, a given card can be inserted into either of the two slots 121 and 122.

It should be noted that a modem 118 and an NCU 119 may be omitted in the following cases: (1) if a modem card with an NCU capable of replacing the function of the modem 118 and the NCU 119 is set into the card slot 121 (or 122); (2) if the ROM 102 or the RAM 103 or a storage enabled card, such as a memory card or a hard disk card, set in an empty card slot 122 (or 121) stores a program for controlling the modem card with the NCU and data; and (3) if the CPU 101 is able to use the foregoing control program and the data.

The modem 118 has a modulator and demodulator circuit adapted to the facsimile standards G3, G2 and G1 and the old FM system to modulate or demodulate a signal to be transmitted/received through the NCU 119.

The NCU 119, as known, comprises a DC capturing circuit, a 2-line/4-line conversion circuit, a receiving circuit, a circuit for detecting signals, and a line switching circuit, the NCU 119 causing signals to be transmitted/received between the subscriber's line or the mobile communication device and the modem 118.

In a case where the apparatus is connected to a general subscriber's line to perform facsimile communication, a modem card shown in FIG. 18 is used. The CPU 50 and the ROM 52 are included in the body of the apparatus to simplify transfer of commands and data to the body in a case where a technically advanced function, such as Class 1 and 2 of fax modem, is intended to be realized, and therefore they may be omitted from the structure.

If a plurality of connection terminals (modular jacks or the like) for establishing the connection with outside and F/T switching hardware are provided for the NCU 60, then F/T switching can be realized.

By setting the modem card with an NCU shown in FIG. 18 into the card slot 121 or 122 and by reading a required program from software of the modem card or from software corresponding to the modem card to operate the CPU 101, optimum communication with a general line can be performed under a variety of conditions without use of the NCU 119 and the MODEM 118 of the body of the apparatus. As a matter of course, the NCU 119 and the MODEM 118 of the body of the apparatus may be used to obtain a similar effect. If the apparatus is used overseas, a modem card with an NCU adapted to the line characteristic for use in the country and to the communication setting regulated by PTT is set, and therefore the apparatus can be used in a multiplicity of countries.

Figure 27:
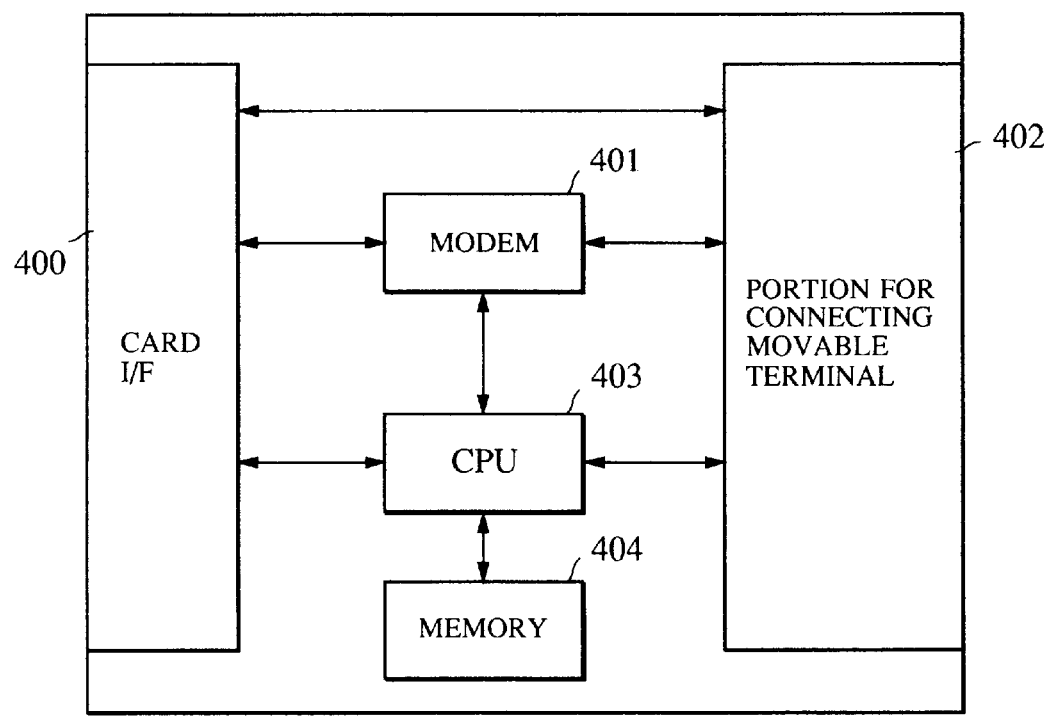

FIG. 27 is a schematic block diagram showing the structure of a Cellular Interface card with a connector for a mobile terminal for establishing the connection with a wireless mobile terminal. The Cellular Interface card with a connector for a mobile terminal comprises a card interface 400, a modem 401, a connector 402 for a mobile terminal, a CPU 403 and a memory 404. Also in a case where wireless data communication is performed, the foregoing Cellular Interface card is used. The CPU 403 and the memory 404 are included in the body of the apparatus to simplify transfer of commands and data to the body in a case where a technically advanced function, such as Class 1 and 2 of fax modem, is intended to be realized, and therefore they may be omitted from the structure.

The card shown in FIG. 27 is set into the card slot 121 or 122, and the CPU 101 is operated by corresponding software. Thus, optimum communication with any one of a variety of mobile communication lines can be performed easily without use of the NCU 32 and the modem 30 of the body of the apparatus. As a matter of course, the card shown in FIG. 27 and software therefor that are adapted to the mobile communication line intended to be used, must be used.

Figure 28:
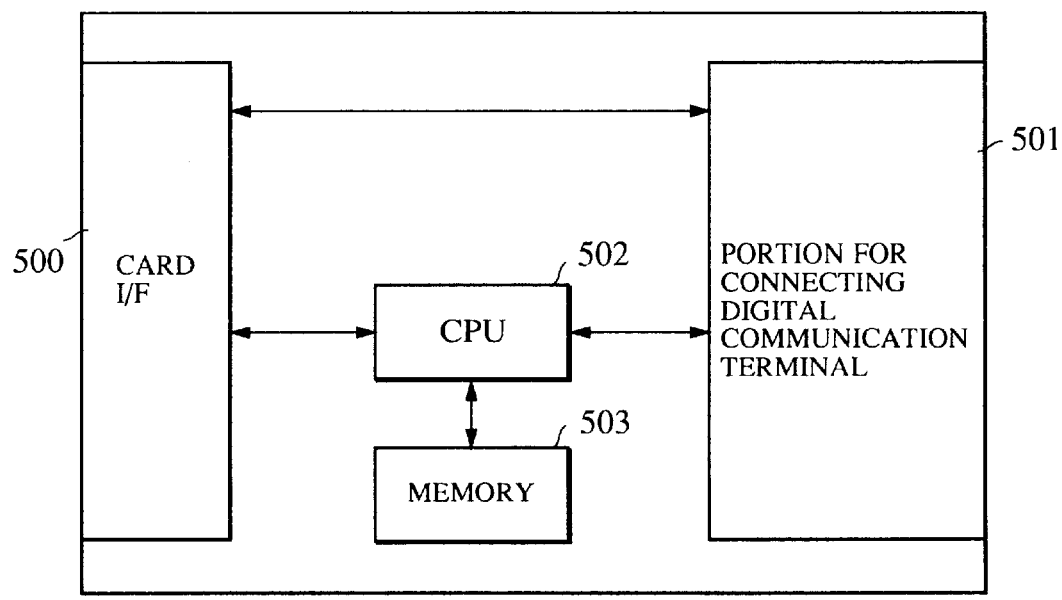

FIG. 28 is a block diagram showing the schematic structure of a communication card with a connector for a establishing connection with a digital communication terminal. The communication card with a connector for a digital terminal shown in FIG. 28 comprises a card interface 500, a connector 501 for a digital terminal, a CPU 502 and a memory 503. The CPU 502 and the memory 503 are included in the body of the apparatus to simplify transfer of commands and data to the body in a case where a technically advanced function is intended to be realized, and therefore may be omitted from the structure.

By setting the card shown in FIG. 28 into the card slot 121 or 122 and by operating the CPU 101 by a corresponding software, communication through a digital line can be performed without use of the NCU 119 and the modem 118 of the body of the apparatus. As a matter of course, the card shown in FIG. 28 and software therefor that correspond to the digital communication line intended to be used, must be used.

Figure 29:
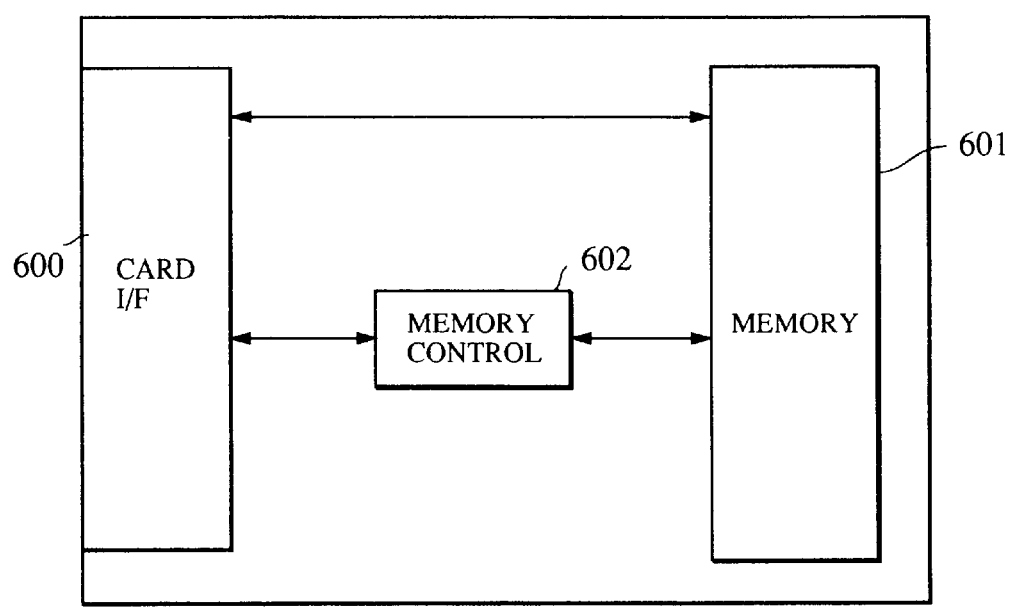

FIG. 29 is a block diagram showing the schematic structure of a memory card. The memory card shown in FIG. 29 comprises a card interface 600, a memory 601 and a memory control circuit 602. The memory control circuit 602 is used in a case where transfer of commands and data to the body of the apparatus is intended to be simplified, and therefore the memory control circuit 602 is sometimes omitted from the structure. The memory 601 comprises a ROM, RAM, PROM, EEROM or a flash memory, or a combination of them. When the card shown in FIG. 29 is set into the card slot 121 or 122 and the CPU 101 is operated with predetermined software, a program or data can be transferred between the RAM 103 and the memory 601 of the body of the apparatus.

Figure 30:
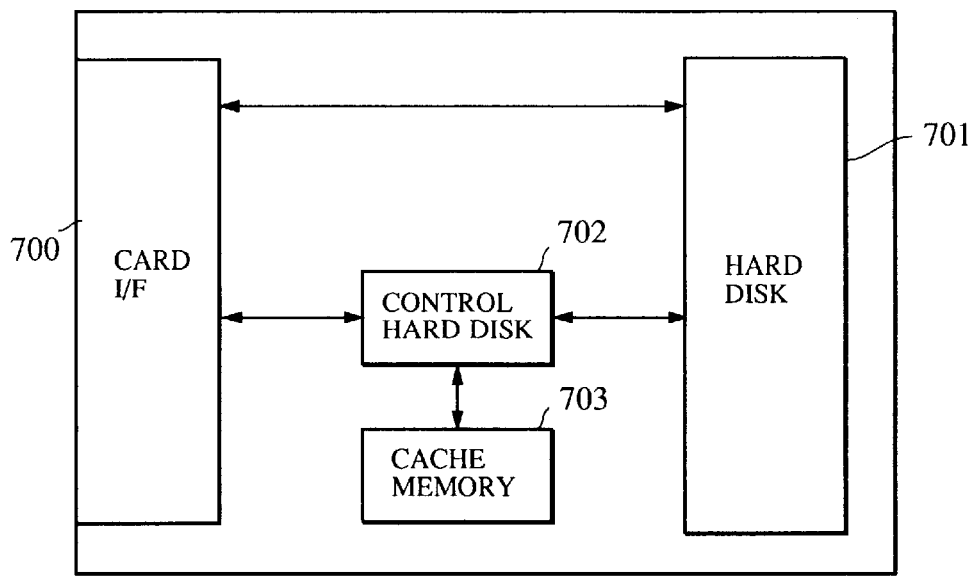

FIG. 30 is a block diagram showing the schematic structure of a hard disk card. The hard disk card shown in FIG. 30 comprises a card interface 700, a hard disk 701, a hard disk control circuit 702 and a cache memory 703. The cache memory 703 enables reading and writing of data to be performed at high speed, the cache memory 703 being sometimes omitted from the structure. The card shown in FIG. 30 is set into the card slot 121 or 122 and the CPU 101 is operated with predetermined software. Thus, programs and data can be transferred between the RAM 103 and the hard disk 701 of the body of the apparatus.

Figure 31:
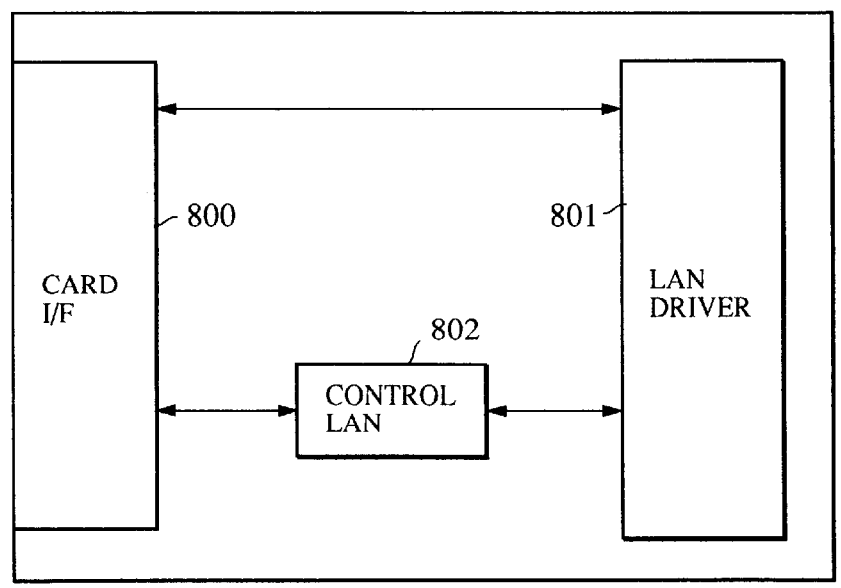

FIG. 31 is a block diagram showing the schematic structure of a LAN (Local Area Network) card. The LAN card shown in FIG. 31 comprises a card interface 800, a LAN driver 801 and a LAN control circuit 802. The LAN driver 801 is adaptable to, for example, the Ethernet standard (a communication connection standard developed by Xerox). The LAN control circuit 802 is included in the body of the apparatus to simplify transfer of commands and data to the body and to reduce the load on the body of the apparatus in a case where a technically advanced function is intended to be realized, and therefore they may be omitted from the structure. By setting the card shown in FIG. 31 into the card slot 121 or 122 and by operating the CPU 101 with a predetermined software, the connection with the LAN can be established. By preparing a card adaptable to a variety of communication protocols, adaptation to a plurality of communication protocols can be realized.

Figure 32:
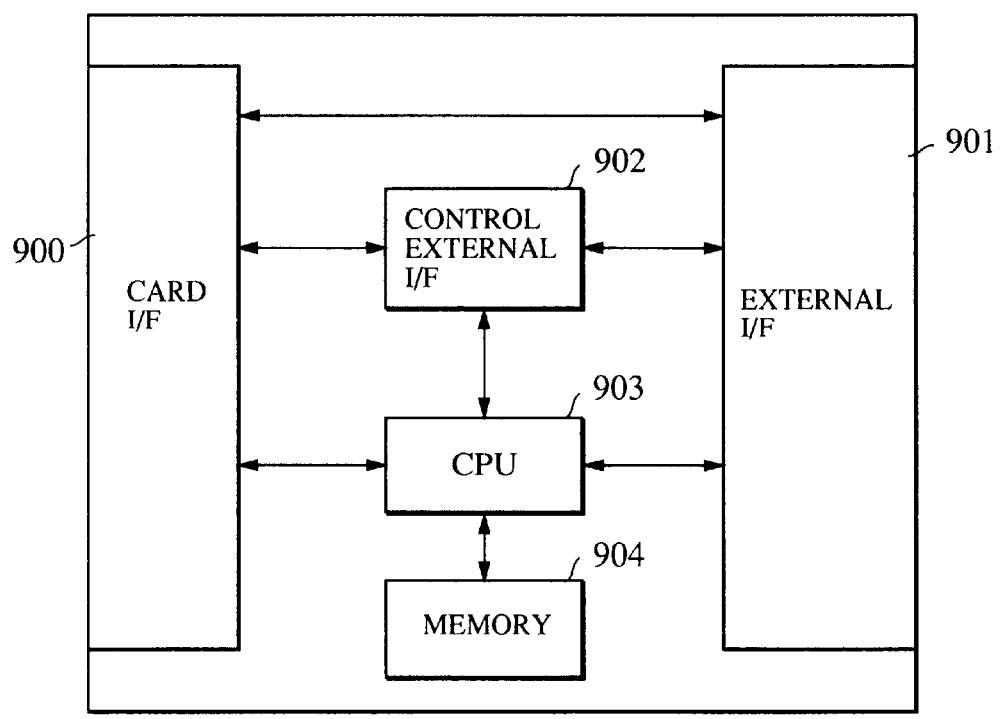

FIG. 32 is a block diagram showing the schematic structure of an interface card for establishing the external connection. The interface card shown in FIG. 32 comprises a card interface 900, an external interface 901, an external interface control circuit 902, a CPU 903 and a memory 904. The external interface 901 is adapted to, for example, Centronics or SCSI. The external interface control circuit 902, the CPU 903 and the memory 904 are included in the body of the apparatus to simplify transfer of commands and data to the body in a case where a technically advanced function is intended to be realized, and therefore they may be omitted from the structure.

A specific example of a case where the foregoing card is set into the body of the apparatus will now be described with reference to FIGS. 33 to 39. In this example, a program IC card stores a predetermined program and/or data. Whether a required program and/or data is transferred to the body of the apparatus or another card, or the body of the apparatus or the other card accesses the program IC card, depends upon the combination of the program IC card, the other card and the body of the apparatus. The program IC card is, for example, the memory card shown in FIG. 29 or the hard disk card shown in FIG. 30.

Figure 33:
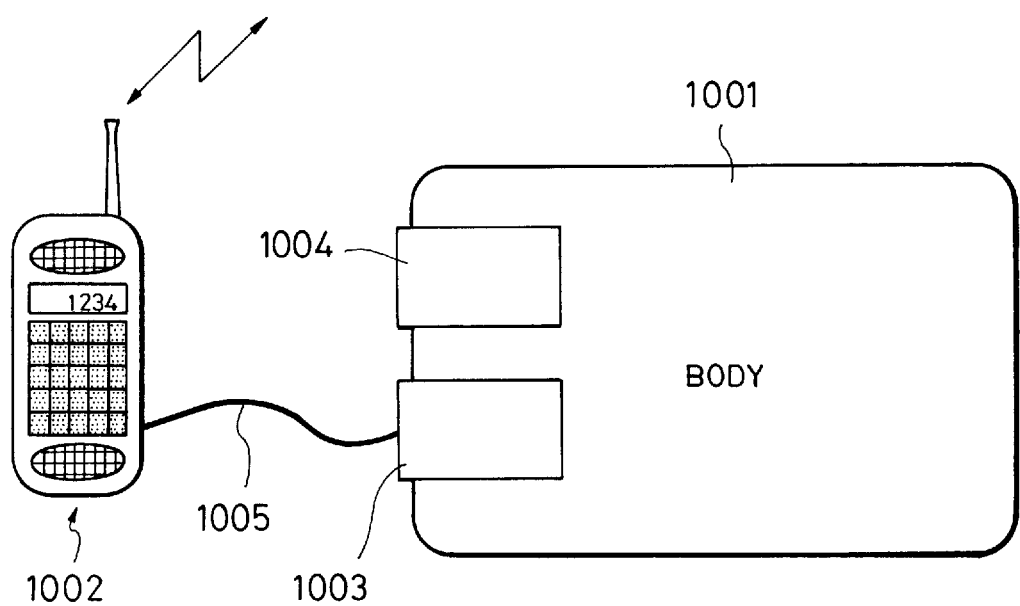
FIGS. 33 to 39 show a specific example in which a variety of cards are applied to the data processing apparatus according to this embodiment of the present invention.

FIG. 33 shows an example of the connection of a mobile terminal. A digital Cellular Interface card 1003 for connecting a digital Cellular unit 1002 is connected to either card slot of a body 1001 (a data communication apparatus according to this embodiment). On the other hand, a program IC card 1004 for storing the program (and data) of the body 1001 for using the digital Cellular Interface card 1003 is connected to another card slot. The digital Cellular unit 1002 is connected to the Cellular Interface card 1003 through a connection cord 1005.

The program IC card 1004 stores a program and data relating to the communication procedure with the digital Cellular unit 1002. The body 1001 performs digital communication through the digital Cellular 1002 in accordance with the stored program.

As a matter of course, analog communication can be performed.

Figure 34:
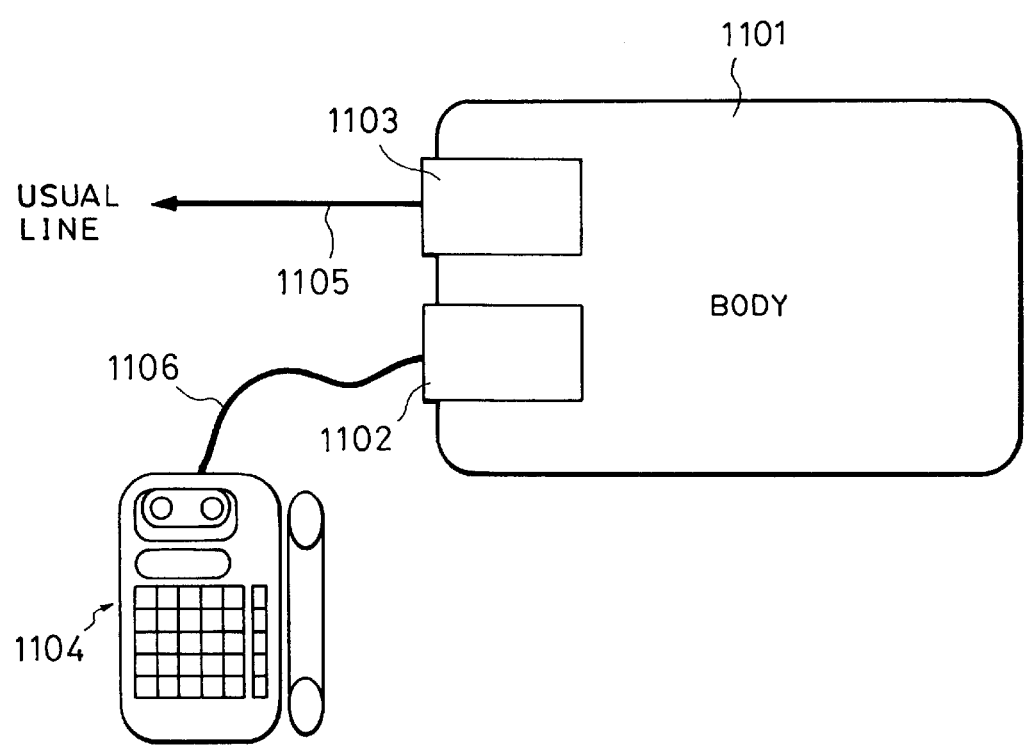

FIG. 34 illustrates an example of a structure for automatically switching between an automatic answering and recording telephone and the body of the apparatus in a case where the data communication apparatus according to this embodiment is used as a facsimile apparatus.

A MODEM card 1102 having an NCU with a F/T switching function and a storage program IC card 1103 are inserted in (or otherwise connected to) to the body 1101 (the data communication apparatus according to this embodiment), the storage program IC card 1103 being a card which can be connected to a usual telephone line and which stores a program and data for using the MODEM card 1102. The usual telephone line and the automatic answering and recording telephone 1104 are connected to the modular jacks of the card 1102 through corresponding connection cords 1105 and 1106.

In accordance with the control program for the MODEM card, an F/T switching program, and sound response information and automatic switching condition information stored in the program IC card 1102, the body 1101 controls the MODEM card 1102 so that FT switching is realized.

Figure 35:
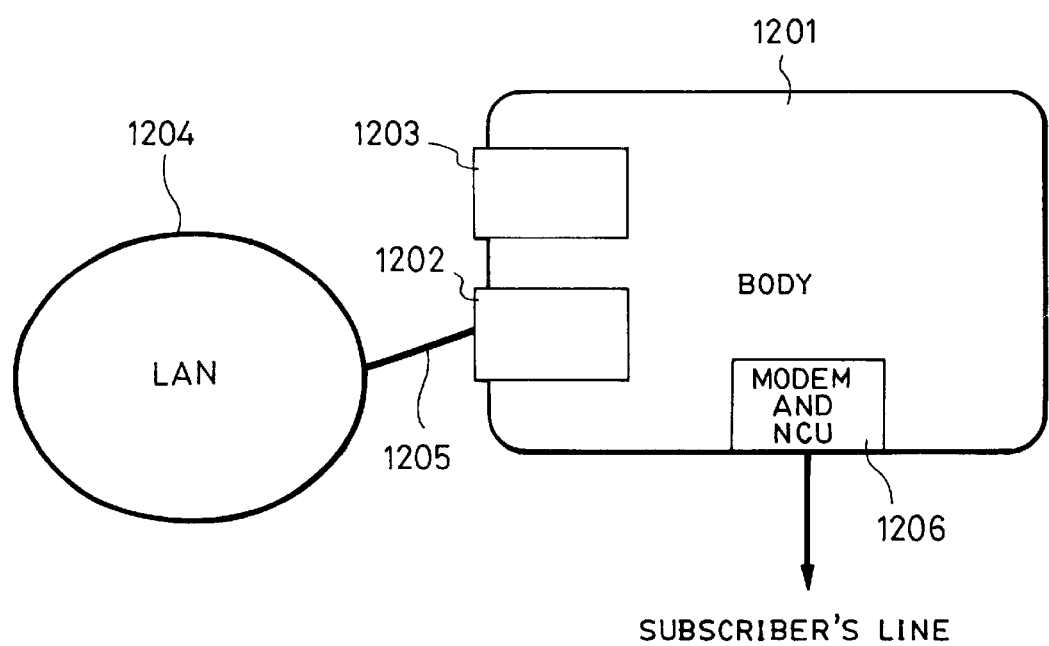

FIG. 35 illustrates an example of a case where the data communication apparatus according to this embodiment is connected to a LAN so that the apparatus is used as a LAN FAX for transferring data through the LAN.

A LAN connection card 1202 and a program IC card 1203 are set to a body 1201 (the data communication apparatus according to this embodiment), the program IC card 1203 storing a program for controlling the LAN connection card 1202 and data. The LAN connection card 1202 is connected to the LAN 1204 through the connection cord 1205. The body 1201 includes the modem (118 shown in FIG. 26) and the NCU (119 shown in FIG. 26) as indicated by reference numeral 1206, the NCU being connected to the subscriber's line.

In accordance with a program for establishing the connection with the LAN, the communication procedure, the ID code, and password stored in the program IC card 1203, the body 1203 transfers data to and from the LAN 1204. Since the connection with the subscriber's line is established by means of the modem 118 and the NCU 119 included in the body 1201, facsimile communication with a connected station can be performed through the LAN 1204 and the line.

It is apparent that if the modem included in the body 1201 has a communication function with a computer, then computer communication can be performed.

Figure 36:
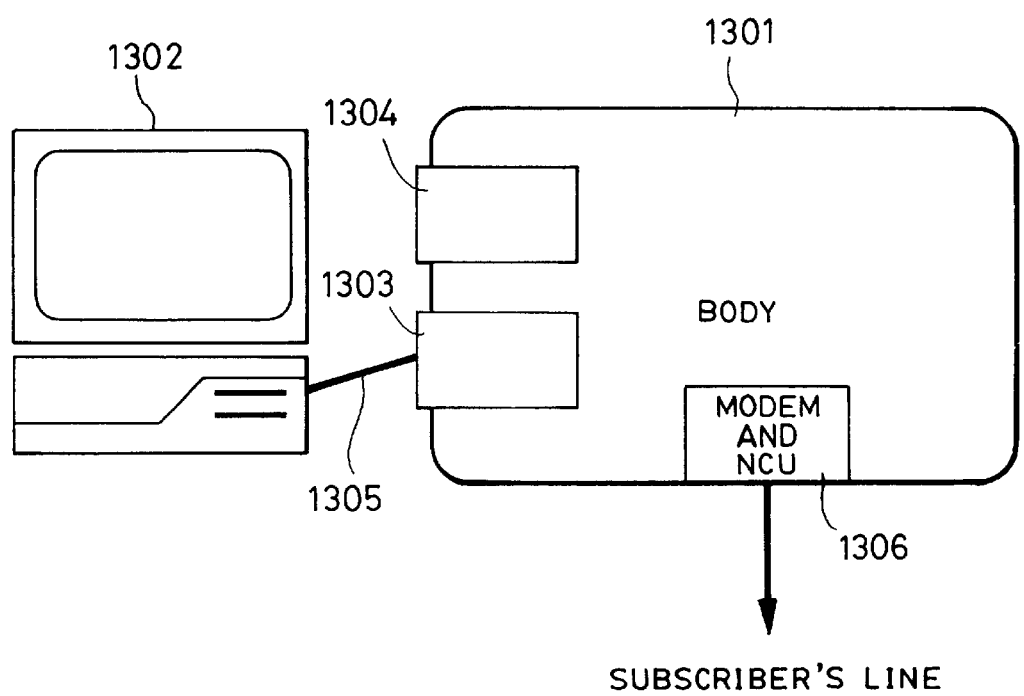

FIG. 36 illustrates a specific example of a case where an external personal computer controls the data communication apparatus according to this embodiment to realize facsimile communication.

An interface card 1303 for establishing the connection with a personal computer 1302 and a program IC card 1304 are inserted in (or otherwise connected to) to the body 1301 (the data communication apparatus according to this embodiment), the program IC card 1304 storing a program for using the interface card 1303 and data. The interface card 1303 is made adaptable to the purpose, for example, any interface standard, such as Centronics, SCSI or RS232C, and any card standard, such as PCMCIA. In a case where the personal computer 1302 has control programs for controlling the body 1301 considered as a scanner, a printer or a modem, the program IC card 1304 is not required. The personal computer 1302 and the interface card 1303 are connected to each other through a connection cord 1305. The body 1301 includes the modem (118 shown in FIG. 26) and the NCU (119 shown in FIG. 26) as indicated by reference numeral 1306, the NCU being connected to the subscriber's line.

In accordance with an interface program and a connection procedure stored in the program IC card 1304 and arranged to be connected to the personal computer 1302, the body 1301 transfers data to and from the personal computer 1302. The personal computer 1302 realizes facsimile communication through a subscriber's line by means of the modem 118 and the NCU 119 included in the body 1301.

In a case where the modem included in the body 1301 has a function of communicating with a computer, simultaneous setting of a program IC card 1304 storing a communication program enables the personal computer 1301 to perform computer communication through a subscriber's line.

By causing data transference between the personal computer 1302 and the interface card 1303 to be performed in accordance with an AT command, the body 1301 can be controlled such that a general-purpose communication software is used on the personal computer 1302 to control Fax Modem Classes, 1, 2 and 3.

Figure 37:
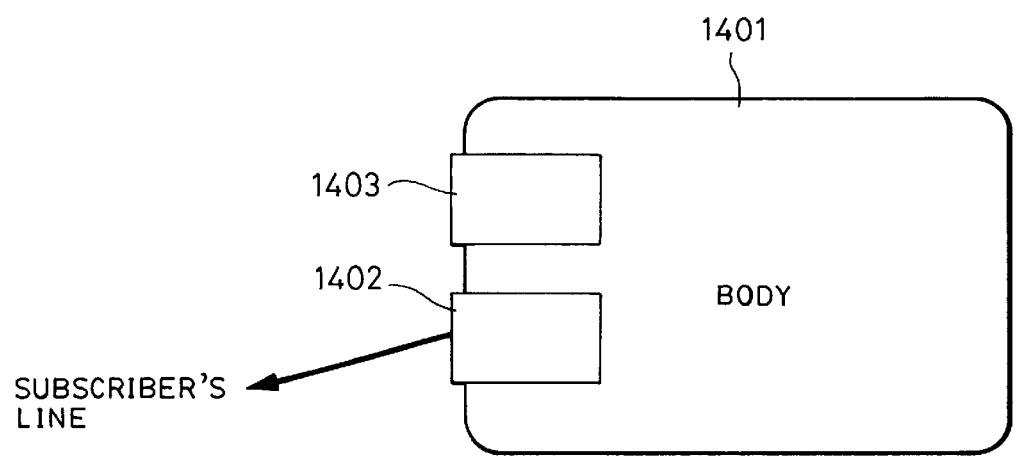

FIG. 37 illustrates a schematic example of facsimile communication performed such that a modem card generally adapted to personal computers is connected to the data communication apparatus according to this embodiment.

A modem card 1402 with an NCU and a program IC card 1403 are set to a body 1401 (the data communication apparatus according to this embodiment), the program IC card 1403 storing a program for controlling the modem card 1402 and data. The modem card 1402 is connected to a subscriber's line.

In accordance with the modem card control program and a control procedure stored in the program IC card 1403, the body 1401 controls facsimile communication by means of the modem card 1402.

It is apparent that the computer communication can be realized if the following units can be prepared: external human-interface units (means positioned at the junction with a user, such as a display, a keyboard and a mouse) that can be connected to the body 1401; a modem card adapted to computer communication; and a program IC card storing a computer communication program for supporting computer communication.

A major portion of modem cards developed recently and capable of performing facsimile communication is adapted to fax modem standards classes 1, 2 and 3 and therefore uses a common AT command as the control code. Therefore, the card control program to be supplied by the program IC card 1403 is optimally a program adapted to the AT command. In this case, the selectable range for the modem card 1402 can be widened.

Figure 38:
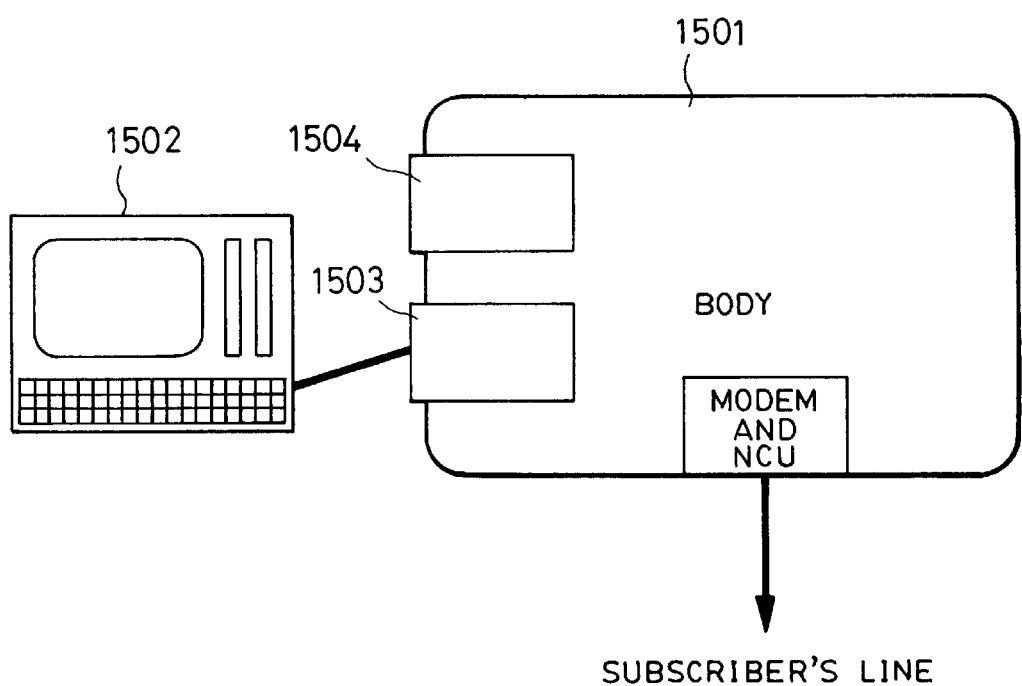

FIG. 38 illustrates an example of a structure for realizing a facsimile apparatus using an external optional unit (a unit added afterwards, such as a personal computer).

An interface card 1503 for connecting an optional unit 1502 and a program IC card 1504 are connected to a body 1501 (the data communication apparatus according to this embodiment), the program IC card 1504 storing a program for using the interface card 1503 and data. The interface card 1503 is made to meet the purpose and is adaptable to Centronics, SCSI, RS232C or PCMCIA.

As a result, the body 1501 is able to extend or change a function thereof that is unsatisfactory to realize a new function or the like. Therefore, a function outdated due to the advance of technology can be changed to a new function based on new technology, or a novel standard or new specification can be met.

The optional unit 1502 may be selected to meet the requirement for a user, or another optional unit that has been used by another device (a computer) may be employed. Furthermore, a device that is not adapted only to the apparatus according to the present invention may be employed. Thus, the optional unit can be selected widely and available at low cost. However, the interface card 1503 for connecting the optional unit 1502 and software adapted to the interface card 1503 are sometimes required. Typical functions of the optional unit 1502 to be added or changed are exemplified by high-quality image reading and printing, high speed communication, enlargement of the storage capacity, high efficiency process and mutlifunction.

Specifically, the data input means is exemplified by a keyboard, a mouse, a microphone, a handheld scanner and a high-quality color scanner.

The data display, output and reproducing means are exemplified by a display unit, speakers and a high-quality color printer.

The data storage means is exemplified by a hard disk, a memory, a CD-ROM drive unit, a floppy disk drive unit, an optical disk drive unit and an optomagnetic disk drive unit.

The data transfer means and the communication means are exemplified by an automatic answering and recording telephone, a digital modem, an analog modem and a wire/wireless communication device.

The calculating means for performing high-speed processes or high-quality processes is exemplified by an image processor, data retrieving hardware, and a compression/decompression processor adapted to JEPG or JBIG.

In accordance with an interface program and procedure data stored in the program IC card 1504, the body 1501 transfers data to and from the optional unit 1502. The body 1501 as well as performs facsimile communication by using the modem 118 and the NCU 119 included in the body 1501.

Figure 39:
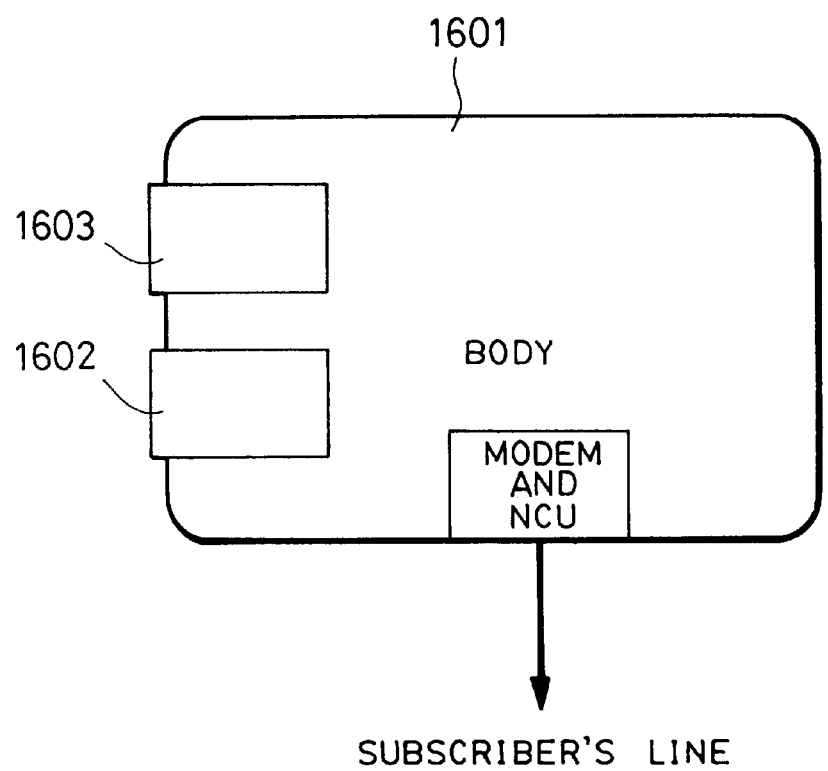

FIG. 39 illustrates a schematic example of a facsimile apparatus to which functions can be added afterwards.

An additional function card 1602 for adding a function and a program IC card 1603 for storing a program and data for using the function of the additional function card 1602 are set to a body 1601 (the data communication apparatus according to this embodiment). The additional function card 1602 is exemplified by a storage card having a hard disk, a ROM or a RAM, or a calculation card having a coprocessor or a DSP.

The body 1601 uses the included modem and NCU to perform facsimile communication through the subscriber's line in accordance with a new program (for example, a new standard for transferring a sentence and graphics in mode G3 with a procedure and a compression method enabling an excellent communication efficiency to be realized) stored in the program IC card 1603.

The additional function card 1602 reduces the load for the CPU 101 of the body 1601 and performs a function that is impossible for the CPU 101. If the additional function card 1602 is a storage card, memory communication and a center facsimile function for performing communication with a multiplicity of facsimile apparatuses can be newly provided.

Figure 40:
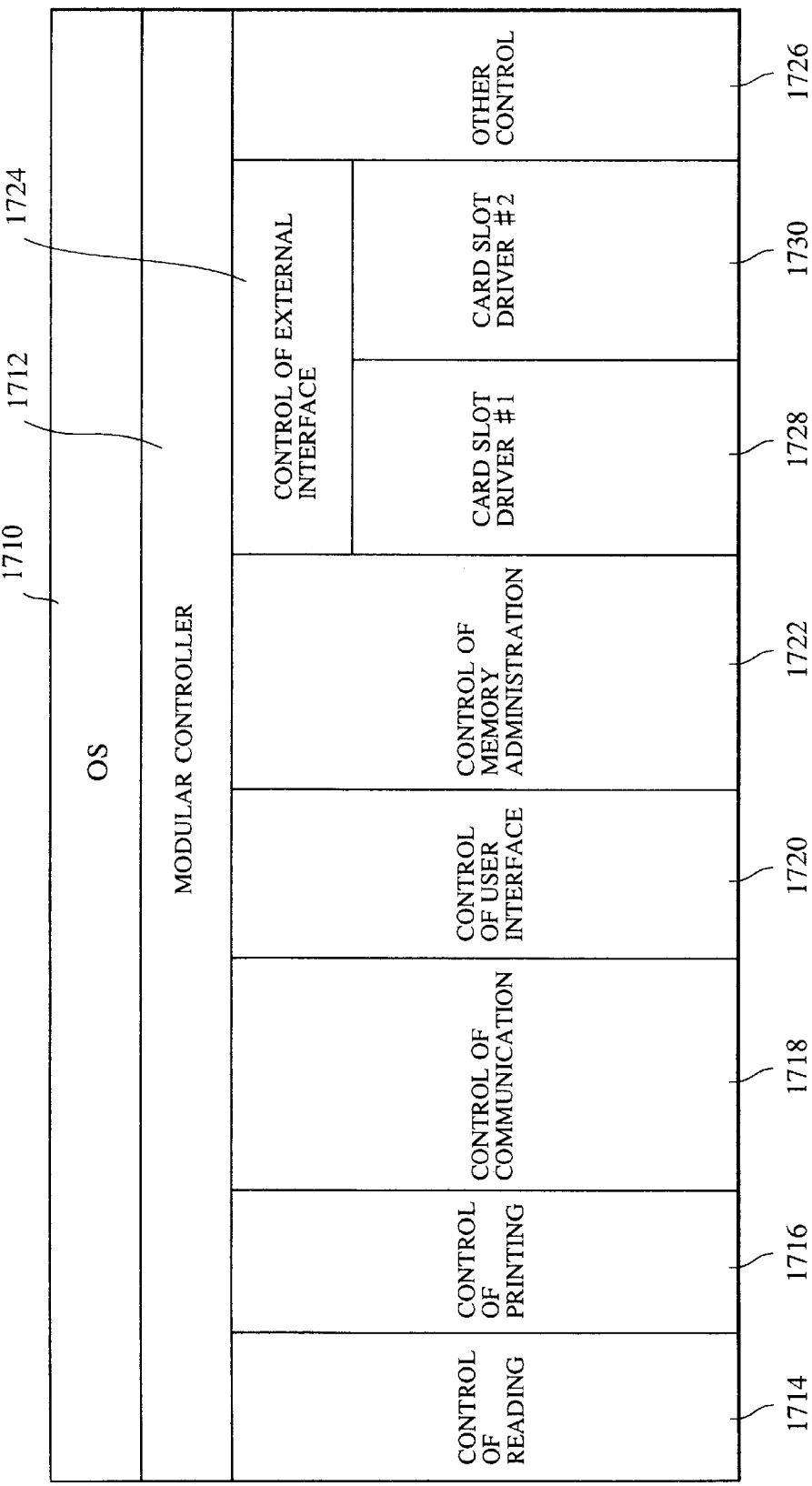
FIG. 40 shows an example of software applied to the data processing apparatus according to this embodiment of the present invention.

FIG. 40 illustrates a basic structure of software for operating the data communication apparatus according to this embodiment. The foregoing structure is substantially the same as that of a computer. A module controller 1712 for determining the priority order of the respective modules, with which a module to be controlled with priority is determined, and which instructs to drive the module, is disposed under an OS (Operating System) 1710. The module controller 1712 controls the following modules: a reading control module 1714; a printing control module 1716; a communication control module 1718; a user interface control module 1720; a memory administration control module 1722; an external interface control module 1724; and a module 1726 for controlling other functions.

The reading control module 1714 controls reading of an image or the like performed by the reading portion 109. By changing the reading control module 1714, functions required to perform reading, such as the reading level and the pixel density of an image to be read, can be changed.

The printing control module 1716 controls printing of an image and a list to be performed by the recording portion 110. By changing the printing control module 1716, the functions required to perform recording, such as the recording range, the recording density and recording of a desired list, can be changed.

The communication control module 1718 controls the modem and the NCU and controls data transference to and from the connected station and data compression/decompression. By changing the communication control module 1718, the functions required to control communication, such as the communication speed and the compression method, can be changed.

The user interface control module 1720 reads data input by a user with keys, displays information on the display portion 105 and performs the process. The user interface control module 1720 corresponds to addition of a new function.

The memory administration control module 1722 administrates picture information data, user data and service man data, controls transference of a program and data from the memory card to the RAM 103 of the body of the apparatus, and administrates data stored in the RAM 103. The memory administration control module 1722 administrates an added storage region of a memory card or the like as well as the storage region of the RAM 103.

The external interface control module 1724 controls data transfer to and from software for controlling input/output of data to and from the card slots 121 and 122 and other control software. Card slot driver software 1728 and 1730 for each card slot are disposed under the external interface control module 1724. Each of the driver software 1728 and 1730 is supplied from the ROM 102 of the body of the apparatus or from another card or stored in the memory card. The driver software is adapted to the body of the apparatus and to the card set in each card slot to operate the set card so as to control data transfer between the body and the card.

If information of the type of the card is unknown for the body of the apparatus in a case where, for example, the card has been changed, the external interface control module 1724 sets card slot driver software and operates the program of the software prepared in a portion of each of the card slot driver software 1728 and 1730 to correspond to a variety of cards so as to detect the type of the card.

If the software, which is being used, cannot be adapted to the set card, this fact is notified to the OS 1710 through the external interface control module 1724 and the module controller 1712. The OS 1710 performs display on the display portion 1051 to urge the user to perform a required process, such as change of the corresponding program IC card or another card. The program IC card stores software shown in FIG. 40.

Figure 41:
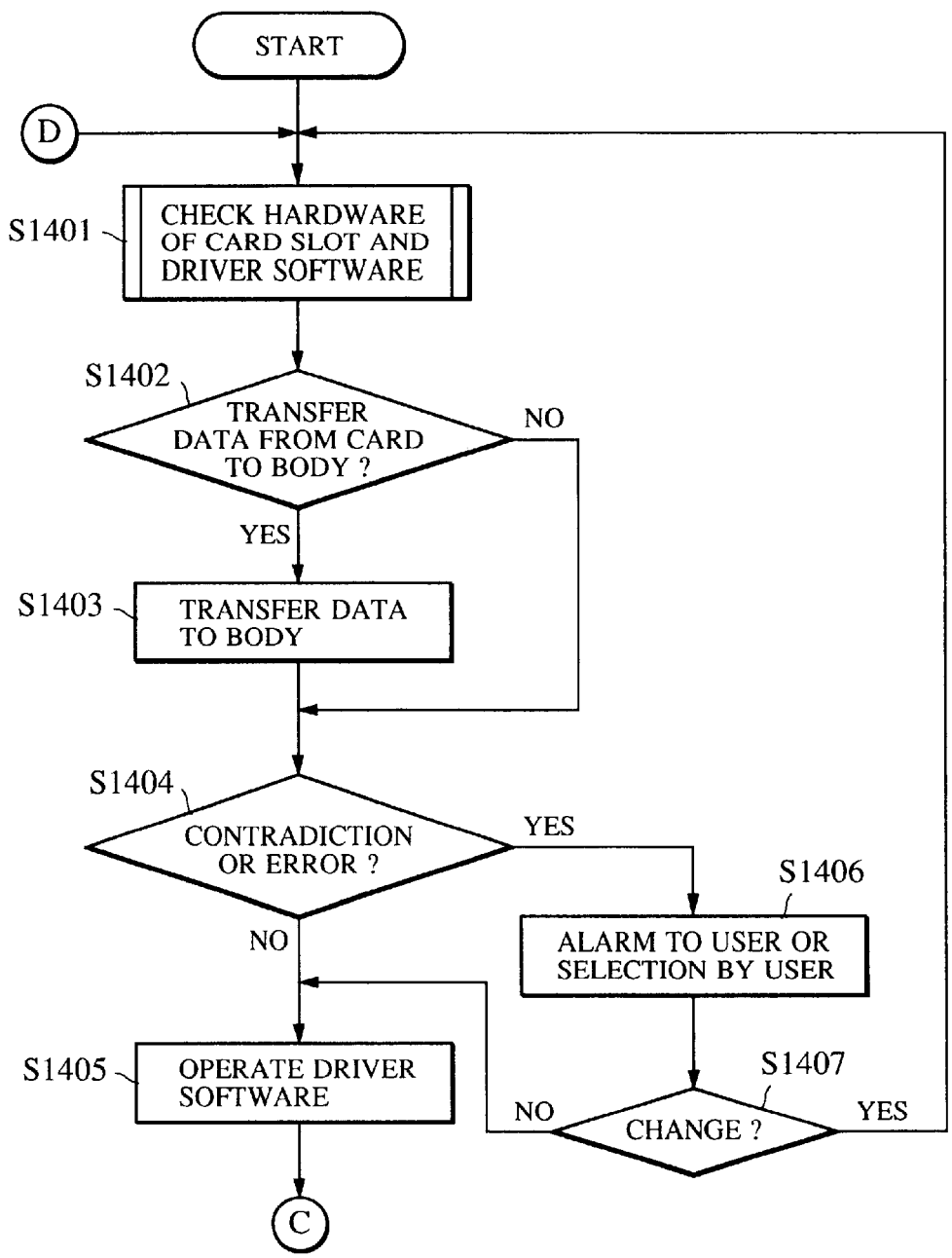
Figure 42:
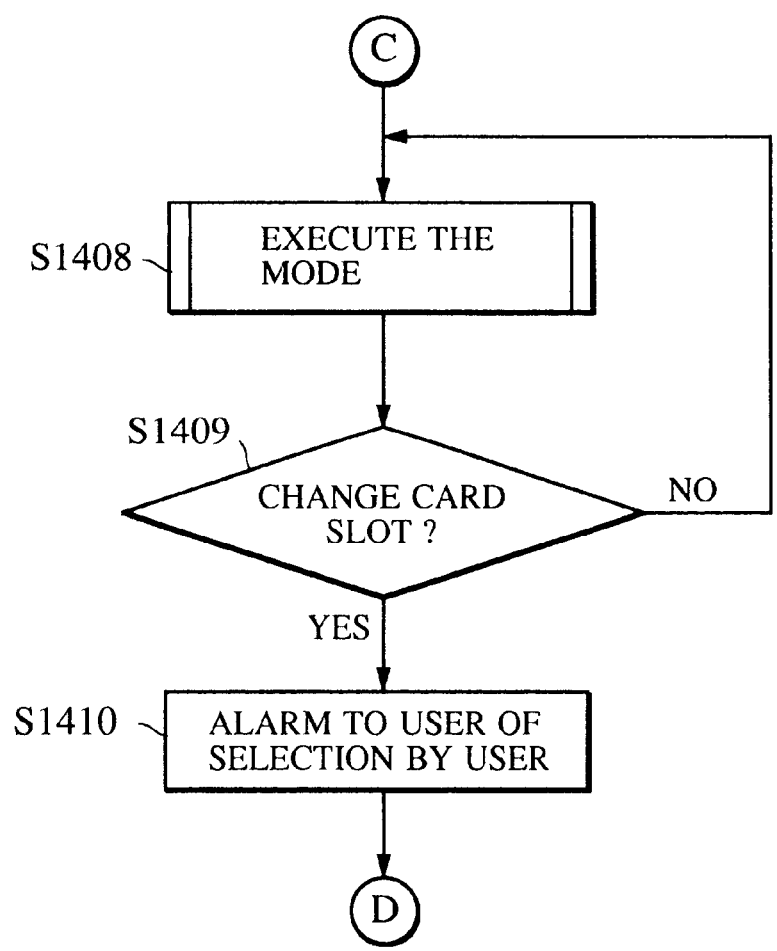

Referring to a flow chart show in FIGS. 41 and 42, a process to be performed by the CPU 101 in a case where the card is initialized and the card has been changed will now be described.

The operation starts when power is supplied. An assumption is made here that a memory card has been inserted into either of the card slots. The type of the set card (the memory, LAN and the modem) is examined by hardware or driver software (S1401).

Whether or not data in the card is required to be transferred to the body of the apparatus, is checked (S1402). Data discriminated by the body of the apparatus or a user to be transferred is transferred from the card to the body (S1403).

An examination is made as to whether or not the program and data in the memory of the body of the apparatus and set storage card (a memory card or the like) correspond to the set card and the body (S1404). At this time, a check is performed as to whether or not contradiction takes place (although a modem card is set, the program correspond to LAN) or an error (for example, a hardware error of the error or the program transferred to the body of the apparatus cannot be executed due to wanting of memory) occurs. If contradiction or an error takes place (S1404), an alarm of this fact is provided to the user through the display portion 105 to urge the user to change the card or the like to overcome the error or the contradiction (S1406). If the card is changed, the operation returns to step S1401. If no change takes place (S1407), then the process following step S1405 is continued.

If neither contradiction nor error takes place (S1404), or if the card is not changed although a contradiction or an error takes place (S1407), only drive software that can be used is operated (S1405), so that the set card is operated.

Then, facsimile communication or copying operation is performed in a mode selected by the operation performed by the user (S1408). Since the operation to be performed here is the same as that described above, it is omitted from this description. If no card is set, an operation, for example, communication, is performed that can be performed by only the body of the apparatus. When the card has been set and software corresponding to the card has been supplied, an operation using the set card is performed.

If the card set in the card slot has been changed (S1409), change of the drive software required when the card is changed is required for the user through the display portion 105 (SL410). Then, the operation returns to step S1401.

In the foregoing case where the card has been changed or where the card does not correspond to the drive software, the user is able to make the card and the software correspond to each other by changing the card and the software.

Although the foregoing description has been made about the structure in which the program and data are read from the memory card, such as the program IC card, an arrangement in which the program and data are stored in the interface card enables the number of the card slots to be reduced to one. In this case, the size of the apparatus can be reduced.

Another structure may be employed in which a variety of programs is stored in the program IC card and the inserted interface card is identified to read the corresponding program. A program IC card storing a program for each interface card may be prepared.

According to this embodiment, since the card interface is unified to the PCMCIA card, another card can be used.

As can be readily understood from the foregoing description, according to this embodiment, the user selects hardware and/or software for establishing the connection with outside to meet the purpose for the user to load or connect the selected hardware and/or software to the body of the apparatus so that the structure of the hardware and software of the apparatus can be simplified and the cost of the body of the apparatus can be reduced.

Since a usual and common type card interface, such as PCMCIA, is employed, the user is able to select cards widely so that hardware which has been employed in another unit (a computer) can be used. As a result, a low-cost and reliable function module can be made available. Since PCMCIA is used widely in information terminals, such as personal computers, hardware which has been used in the information terminal can be used as it is.

Furthermore, the hardware and software can be changed afterwards. Since functions can easily be added or changed, the apparatus can be used for a longer period.

As described above, according to the present invention, a variety of operations each using the card interface can be performed without increasing the cost.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A data processing apparatus that includes a reading portion and a recording portion, said apparatus comprising:

a connector, arranged to connect to each of a plurality of detachable interface cards to establish a connection with an external apparatus, the plurality of interface cards including a modem card and a printer card;

a discrimination unit, arranged to discriminate a type of an interface card connected to said connector in accordance with a connection of any of the plurality of interface cards; and a controller, arranged to control the recording portion to operate as a printer to process data received via the interface card as print data in a case where the interface card connected to said connector is discriminated to be a printer card, and to control one of the reading portion and the recording portion to operate as a facsimile apparatus to process data sent or received via the interface card as facsimile data in a case where the interface card connected to said connector is discriminated to be a modem card, wherein said controller informs the external apparatus of status information concerning whether or not the recording portion is able to print via the interface card when the interface card connected to said connector is used with a printer, and wherein said data processing apparatus is operable with any of the plurality of interface cards.

2. A data processing apparatus according to claim 1, further comprising a communication unit, arranged to communicate with the external apparatus via the interface card.

3. A method of using a data processing apparatus that includes a reading portion and a recording portion, said method comprising the steps of:

connecting to any of a plurality of detachable interface cards to establish a connection with an external apparatus, the plurality of interface cards including a modem card and a printer card;

discriminating a type of a connected interface card in accordance with a connection of any of the plurality of interface cards; and controlling the recording portion to operate as a printer in a case where the interface card is discriminated to be a printer card, and controlling one of the reading portion and the recording portion to operate as a facsimile apparatus in a case where the interface card is discriminated to be a modem card, wherein said controlling step includes informing the external apparatus of status information concerning whether or not the recording portion is able to print via the interface card when the interface card is used with a printer, and wherein the data processing apparatus is operable with any of the plurality of interface cards.

4. A method according to claim 3, wherein said controlling step controls a memory to store image data to be transmitted via the interface card.

5. A method according to claim 3, wherein said controlling step controls a memory to store image data supplied via the interface card.

6. A data processing apparatus that includes a reading portion and a recording portion, said apparatus comprising:

a connector, arranged to connect to each of a plurality of detachable interface cards, wherein the plurality of interface cards includes a printer card;

a discrimination unit, arranged to discriminate a type of an interface card connected to said connector in accordance with a connection of any of the plurality of interface cards; and a controller, arranged to control the recording portion to operate as a printer to process data received from an external apparatus via the printer card in a case where the interface card connected to said connector is discriminated to be a printer card, wherein said data processing apparatus is operable with any of the plurality of interface cards.

7. A data processing apparatus according to claim 6, wherein said controller is arranged to control one of the reading portion and the recording portion to operate as a facsimile apparatus to process data sent or received via the interface card as facsimile data in a case where the interface card connected to the data processing apparatus is discriminated to be a modem card.

8. A data processing apparatus according to claim 6, wherein said controller informs the external apparatus of status information concerning whether or not the recording portion is able to print via the interface card.

9. A data processing apparatus according to claim 6, wherein the plurality of interface cards includes a modem card.

10. A method for controlling a data processing apparatus that includes a reading portion and a recording portion, said method comprising the steps of:

connecting to any of a plurality of detachable interface cards, wherein the plurality of interface cards includes a printer card;

discriminating a type of an interface card connected in said connecting step in accordance with a connection of any of the plurality of interface cards; and controlling the recording portion to operate as a printer to process data received from an external apparatus via the interface card as print data in a case where the interface card connected in said connecting step is discriminated to be a printer card, wherein the data processing apparatus is operable with any of the plurality of interface cards.

11. A method according to claim 10, further comprising the step of:

controlling one of the reading portion and the recording portion to operate as a facsimile apparatus to process data sent or received via the interface card as facsimile data in a case where the interface card connected in said connecting step is discriminated to be a modem card.

12. A method according to claim 10, further comprising the step of:

informing the external apparatus of status information concerning whether or not the recording portion is able to print via the interface card.

13. A method according to claim 10, further comprising the steps of:

reading information about an attribute of the interface card; and initializing the interface card based on the read information.

14. A method according to claim 10, wherein the plurality of interface cards includes a modem card.

15. A data processing apparatus that includes a reading portion and a recording portion, said apparatus comprising:

a connector, arranged to connect to each of a plurality of detachable interface cards, wherein the plurality of interface cards includes a printer card and a modem card;

a discrimination unit, arranged to discriminate a type of an interface card connected to said connector in accordance with a connection of any of the plurality of interface cards; and a controller, arranged to control the recording portion to operate as a printer in case where the interface card connected to said connector is discriminated to be a printer card, and to control the reading portion or the recording portion to operate as a facsimile unit in case where the interface card connected to said connector is discriminated to be a modem card, wherein said data processing apparatus is operable with any of the plurality of interface card.

16. A method for controlling a data processing apparatus that includes a reading portion and a recording portion, said method comprising the steps of:

connecting to any of a plurality of detachable interface cards, wherein the plurality of interface cards includes a printer card and a modem card;

discriminating a type of an interface card connected in said connecting step in accordance with a connection of any of the plurality of interface cards;

controlling the recording portion to operate as a printer in case where the interface card connected in said connecting step is discriminated to be a printer card; and controlling the reading portion or the recording portion to operate as a facsimile unit in case where the interface card connected in said connecting step is discriminated to be a modem card, wherein the data processing apparatus is operable with any of the plurality of interface card.

* * * * *

UNITED STATES PATENT AND TRADEMARK OFFICE
CERTIFICATE OF CORRECTION

PATENT NO.   : 6,801,328 B2
DATED        : October 5, 2004
INVENTOR(S)  : Takeshi Tsukamoto et al.

It is certified that error appears in the above-identified patent and that said Letters Patent is hereby corrected as shown below:

Column 5,
Line 11, "the-time" should read -- the time --.

Column 15,
Line 20, "a" (first occurrence) should be deleted.

Column 19,
Line 15, "as" (second occurrence) should be deleted.

Column 24,
Line 49, "card." should read -- cards. --.

Signed and Sealed this

Twenty-first Day of February, 2006

JON W. DUDAS
*Director of the United States Patent and Trademark Office*